US012337960B2

(12) United States Patent
Schafer

(10) Patent No.: US 12,337,960 B2
(45) Date of Patent: Jun. 24, 2025

(54) TELESCOPING TAIL ASSEMBLIES FOR USE ON AIRCRAFT

(71) Applicant: Textron Innovations Inc., Providence, RI (US)

(72) Inventor: Steven Ryan Schafer, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 18/140,528

(22) Filed: Apr. 27, 2023

(65) Prior Publication Data
US 2023/0264813 A1   Aug. 24, 2023

Related U.S. Application Data

(62) Division of application No. 17/568,906, filed on Jan. 5, 2022.

(51) Int. Cl.
*B64C 29/02* (2006.01)
*B64C 1/06* (2006.01)
(Continued)

(52) U.S. Cl.
CPC ............. *B64C 29/02* (2013.01); *B64C 1/063* (2013.01); *B64C 5/18* (2013.01); *B64C 9/00* (2013.01);
(Continued)

(58) Field of Classification Search
CPC ........... B64C 29/02; B64C 1/063; B64C 1/30; B64C 5/12; B64C 25/32; B64C 39/04
See application file for complete search history.

(56) References Cited

U.S. PATENT DOCUMENTS 1,655,113 A   1/1928 Nikola
2,601,090 A   6/1952 James
(Continued)

FOREIGN PATENT DOCUMENTS

CN   105539833 A   5/2016
CN   111959752 A * 11/2020
(Continued)

OTHER PUBLICATIONS

Air Launched Unmanned Disaster Relief Delivery Vehicle, 33rd Annual AHS Student Design Competition, University of Maryland, Undated but admitted prior art.
(Continued)

*Primary Examiner* — Joshua J Michener
*Assistant Examiner* — Ashesh Dangol
(74) *Attorney, Agent, or Firm* — Lawrence Youst PLLC

(57) ABSTRACT

A telescoping tail assembly for use on an aircraft that has a fore-aft length. The telescoping tail assembly includes a housing extending in an aftward direction and a tailboom slidable along the housing into various positions including an extended position and a retracted position. A jackscrew is coupled to the tailboom. An actuator is coupled to the jackscrew and is configured to selectively rotate the jackscrew to translate the tailboom between the plurality of positions. The tailboom has one or more control surfaces coupled thereto. The tailboom increases the fore-aft length of the aircraft in the extended position and decreases the fore-aft length of the aircraft in the retracted position.

20 Claims, 12 Drawing Sheets

(51) Int. Cl.

| | | |
|---|---|---|
| *B64C 5/18* | (2006.01) | |
| *B64C 9/00* | (2006.01) | |
| *B64C 25/32* | (2006.01) | |
| *B64C 39/02* | (2023.01) | |
| *B64C 39/04* | (2006.01) | |
| *B64C 39/08* | (2006.01) | |
| *B64U 10/20* | (2023.01) | |
| *B64U 30/40* | (2023.01) | |

(52) U.S. Cl.
CPC ............ *B64C 25/32* (2013.01); *B64C 39/024* (2013.01); *B64C 39/04* (2013.01); *B64C 39/08* (2013.01); *B64U 10/20* (2023.01); *B64U 30/40* (2023.01)

(56) References Cited

U.S. PATENT DOCUMENTS

| | | |
|---|---|---|
| 2,655,997 A | 10/1953 | Peterson |
| 2,688,843 A | 9/1954 | Pitt |
| 3,002,712 A | 10/1961 | Sterling |
| 3,081,964 A | 3/1963 | Quenzler |
| 3,181,810 A | 5/1965 | Olson |
| 3,259,343 A | 7/1966 | Roppel |
| 3,289,980 A | 12/1966 | Gardner |
| 3,350,035 A | 10/1967 | Schlieben |
| 3,592,412 A | 7/1971 | Glatfelter |
| 3,618,875 A | 11/1971 | Kappus |
| 3,783,618 A | 1/1974 | Kawamura |
| 3,916,588 A | 11/1975 | Magill |
| 4,243,358 A | 1/1981 | Carlock et al. |
| 4,458,864 A | 7/1984 | Colombo et al. |
| 4,571,157 A | 2/1986 | Eickmann |
| 4,596,368 A | 6/1986 | Schmittle |
| 4,613,098 A | 9/1986 | Eickmann |
| 4,741,672 A | 5/1988 | Breuner |
| 4,771,967 A | 9/1988 | Geldbaugh |
| 4,913,377 A | 4/1990 | Eickmann |
| 4,925,131 A | 5/1990 | Eickmann |
| 5,131,605 A | 7/1992 | Kress |
| 5,188,512 A | 2/1993 | Thornton |
| 5,592,894 A | 1/1997 | Johnson |
| 5,842,667 A | 12/1998 | Jones |
| 5,875,994 A * | 3/1999 | McCrory ................ B64C 25/20 244/102 R |
| 6,086,015 A | 7/2000 | MacCready |
| 6,170,778 B1 | 1/2001 | Cycon et al. |
| 6,260,793 B1 | 7/2001 | Balayn et al. |
| 6,270,038 B1 | 8/2001 | Cycon et al. |
| 6,402,088 B1 | 6/2002 | Syrovy et al. |
| 6,655,631 B2 | 12/2003 | Austen-Brown |
| 6,845,939 B1 | 1/2005 | Baldwin |
| 6,886,776 B2 | 5/2005 | Wagner et al. |
| 6,892,980 B2 | 5/2005 | Kawai |
| 7,059,562 B2 | 6/2006 | Baldwin |
| 7,150,429 B2 | 12/2006 | Kusic |
| 7,210,654 B1 | 5/2007 | Cox et al. |
| 7,465,236 B2 | 12/2008 | Wagels |
| 7,472,863 B2 | 1/2009 | Pak |
| 7,555,893 B2 | 7/2009 | Okai et al. |
| 7,984,684 B2 | 7/2011 | Hinderks |
| 8,152,096 B2 | 4/2012 | Smith |
| 8,393,564 B2 | 3/2013 | Kroo |
| 8,427,360 B2 | 4/2013 | Longstaff |
| 8,505,846 B1 | 8/2013 | Sanders |
| 8,602,348 B2 | 12/2013 | Bryant |
| 8,646,720 B2 | 2/2014 | Shaw |
| 8,733,690 B2 | 5/2014 | Bevirt et al. |
| 8,800,912 B2 | 8/2014 | Oliver |
| 8,820,672 B2 | 9/2014 | Erben et al. |
| 8,833,692 B2 | 9/2014 | Yoeli |
| 8,909,391 B1 | 12/2014 | Peeters et al. |
| 8,948,935 B1 | 2/2015 | Peeters et al. |
| 9,022,312 B2 | 5/2015 | Kosheleff |
| 9,045,226 B2 | 6/2015 | Piasecki et al. |
| 9,087,451 B1 | 7/2015 | Jarrell |
| 9,108,744 B2 | 8/2015 | Takeuchi |
| 9,109,575 B2 | 8/2015 | Weddendorf et al. |
| 9,120,560 B1 | 9/2015 | Armer et al. |
| 9,127,908 B2 | 9/2015 | Miralles |
| 9,162,753 B1 | 10/2015 | Panto et al. |
| 9,187,174 B2 | 11/2015 | Shaw |
| 9,193,460 B2 | 11/2015 | Laudrain |
| 9,221,538 B2 | 12/2015 | Takahashi et al. |
| 9,242,714 B2 | 1/2016 | Wang et al. |
| 9,254,916 B2 | 2/2016 | Yang |
| 9,284,049 B1 | 3/2016 | Wang et al. |
| 9,321,530 B2 | 4/2016 | Wang et al. |
| 9,376,208 B1 | 6/2016 | Gentry |
| 9,388,794 B2 | 7/2016 | Weddendorf et al. |
| 9,403,593 B2 | 8/2016 | Downey et al. |
| 9,440,736 B2 | 9/2016 | Bitar |
| 9,463,875 B2 | 10/2016 | Abuelsaad et al. |
| 9,493,225 B2 | 11/2016 | Wang et al. |
| 9,610,817 B1 | 4/2017 | Piasecki et al. |
| 9,643,720 B2 | 5/2017 | Hesselbarth |
| 9,694,908 B2 | 7/2017 | Razroev |
| 9,694,911 B2 | 7/2017 | Bevirt et al. |
| 9,714,087 B2 | 7/2017 | Matsuda |
| 9,798,322 B2 | 10/2017 | Bachrach et al. |
| 9,800,091 B2 | 10/2017 | Nugent, Jr. et al. |
| 9,821,909 B2 | 11/2017 | Moshe |
| 9,963,228 B2 | 5/2018 | McCullough et al. |
| 9,994,313 B2 | 6/2018 | Claridge et al. |
| 10,011,351 B2 | 7/2018 | McCullough et al. |
| 10,124,890 B2 | 11/2018 | Sada-Salinas et al. |
| 10,183,746 B2 | 1/2019 | McCullough et al. |
| 10,214,285 B2 | 2/2019 | McCullough et al. |
| 10,220,944 B2 | 3/2019 | McCullough et al. |
| 10,227,133 B2 | 3/2019 | McCullough et al. |
| 10,232,950 B2 | 3/2019 | McCullough et al. |
| 10,266,249 B2 | 4/2019 | Shue |
| 10,301,016 B1 | 5/2019 | Bondarev et al. |
| 10,315,761 B2 | 6/2019 | McCullough et al. |
| 10,322,799 B2 | 6/2019 | McCullough et al. |
| 10,329,014 B2 | 6/2019 | McCullough et al. |
| 10,343,773 B1 | 7/2019 | McCullough et al. |
| 10,351,232 B2 | 7/2019 | McCullough et al. |
| 10,442,522 B2 | 10/2019 | Oldroyd et al. |
| 10,457,390 B2 | 10/2019 | McCullough et al. |
| 10,501,193 B2 | 12/2019 | Oldroyd et al. |
| 10,583,921 B1 | 3/2020 | McCullough et al. |
| 10,597,164 B2 | 3/2020 | Oldroyd et al. |
| 10,604,249 B2 | 3/2020 | McCullough et al. |
| 10,611,477 B1 | 4/2020 | McCullough et al. |
| 10,618,646 B2 | 4/2020 | McCullough et al. |
| 10,618,647 B2 | 4/2020 | McCullough et al. |
| 10,625,853 B2 | 4/2020 | McCullough et al. |
| 10,633,087 B2 | 4/2020 | McCullough et al. |
| 10,633,088 B2 | 4/2020 | McCullough et al. |
| 10,661,892 B2 | 5/2020 | McCullough et al. |
| 10,737,765 B2 | 8/2020 | Oldroyd et al. |
| 10,737,778 B2 | 8/2020 | Oldroyd et al. |
| 10,752,350 B2 | 8/2020 | McCullough et al. |
| 10,870,487 B2 | 12/2020 | McCullough et al. |
| 10,913,541 B2 | 2/2021 | Oldroyd et al. |
| 10,981,661 B2 | 4/2021 | Oldroyd et al. |
| 11,027,837 B2 | 6/2021 | McCullough et al. |
| 11,084,579 B2 | 8/2021 | Ivans et al. |
| 11,091,257 B2 | 8/2021 | McCullough et al. |
| 11,104,446 B2 | 8/2021 | McCullough et al. |
| 2002/0100834 A1 | 8/2002 | Baldwin |
| 2002/0100835 A1 | 8/2002 | Kusic |
| 2003/0062443 A1 | 4/2003 | Wagner et al. |
| 2004/0245374 A1 | 12/2004 | Morgan |
| 2006/0091258 A1 | 5/2006 | Chiu et al. |
| 2006/0266881 A1 | 11/2006 | Hughey |
| 2007/0212224 A1 | 9/2007 | Podgurski |
| 2007/0221780 A1 | 9/2007 | Builta |
| 2008/0125920 A1 | 5/2008 | Miles et al. |
| 2009/0008499 A1 | 1/2009 | Shaw |
| 2010/0147993 A1 | 6/2010 | Annati et al. |
| 2010/0193644 A1 | 8/2010 | Karem |
| 2010/0295321 A1 | 11/2010 | Bevirt |

(56) References Cited

U.S. PATENT DOCUMENTS

| | | |
|---|---|---|
| 2011/0001001 A1 | 1/2011 | Bryant |
| 2011/0036939 A1* | 2/2011 | Easter .................. B64C 39/04 244/46 |
| 2011/0042508 A1 | 2/2011 | Bevirt |
| 2011/0042509 A1 | 2/2011 | Bevirt et al. |
| 2011/0057453 A1 | 3/2011 | Roberts |
| 2011/0121570 A1 | 5/2011 | Bevirt et al. |
| 2011/0315806 A1 | 12/2011 | Piasecki et al. |
| 2012/0209456 A1 | 8/2012 | Harmon et al. |
| 2012/0234968 A1 | 9/2012 | Smith |
| 2013/0020429 A1 | 1/2013 | Kroo |
| 2013/0175404 A1 | 7/2013 | Shefer |
| 2013/0327579 A1* | 12/2013 | Nance .................. B64C 25/00 177/136 |
| 2013/0341458 A1 | 12/2013 | Sutton et al. |
| 2014/0018979 A1 | 1/2014 | Goossen et al. |
| 2014/0097290 A1 | 4/2014 | Leng |
| 2014/0291440 A1* | 10/2014 | Stekelenburg .......... B64C 1/30 244/119 |
| 2014/0339372 A1 | 11/2014 | Dekel et al. |
| 2015/0012154 A1 | 1/2015 | Senkel et al. |
| 2015/0014475 A1 | 1/2015 | Taylor et al. |
| 2015/0136897 A1 | 5/2015 | Seibel et al. |
| 2015/0284075 A1 | 10/2015 | Alber |
| 2015/0284079 A1 | 10/2015 | Matsuda |
| 2015/0285165 A1 | 10/2015 | Steinwandel et al. |
| 2016/0068265 A1 | 3/2016 | Hoareau et al. |
| 2016/0180717 A1 | 6/2016 | Ubhi et al. |
| 2016/0214712 A1 | 7/2016 | Fisher et al. |
| 2017/0008627 A1 | 1/2017 | Soto et al. |
| 2017/0021924 A1 | 1/2017 | Kubik et al. |
| 2017/0066531 A1 | 3/2017 | McAdoo |
| 2017/0097644 A1 | 4/2017 | Fegely et al. |
| 2017/0144746 A1 | 5/2017 | Schank et al. |
| 2017/0158312 A1 | 6/2017 | Alber et al. |
| 2017/0174342 A1 | 6/2017 | Huang |
| 2017/0240274 A1 | 8/2017 | Regev |
| 2017/0297699 A1 | 10/2017 | Alber et al. |
| 2017/0327219 A1 | 11/2017 | Alber |
| 2017/0334557 A1 | 11/2017 | Alber et al. |
| 2018/0002011 A1 | 1/2018 | McCullough et al. |
| 2018/0002012 A1* | 1/2018 | McCullough .......... B64U 70/80 |
| 2018/0002013 A1 | 1/2018 | McCullough et al. |
| 2018/0002014 A1 | 1/2018 | McCullough et al. |
| 2018/0002015 A1 | 1/2018 | McCullough et al. |
| 2018/0002016 A1 | 1/2018 | McCullough et al. |
| 2018/0002026 A1 | 1/2018 | Oldroyd et al. |
| 2018/0002027 A1 | 1/2018 | McCullough et al. |
| 2018/0022467 A1 | 1/2018 | Alber |
| 2018/0044011 A1 | 2/2018 | Reichert |
| 2018/0244377 A1 | 8/2018 | Chan |
| 2018/0244383 A1 | 8/2018 | Valente et al. |
| 2018/0257761 A1 | 9/2018 | Oldroyd et al. |
| 2018/0265193 A1 | 9/2018 | Gibboney et al. |
| 2018/0273160 A1 | 9/2018 | Baldwin et al. |
| 2018/0327092 A1 | 11/2018 | Deng et al. |
| 2018/0362158 A1 | 12/2018 | Zhang et al. |
| 2019/0031331 A1 | 1/2019 | McCullough et al. |
| 2019/0031334 A1 | 1/2019 | McCullough et al. |
| 2019/0031335 A1 | 1/2019 | McCullough et al. |
| 2019/0031336 A1 | 1/2019 | McCullough et al. |
| 2019/0031337 A1 | 1/2019 | McCullough et al. |
| 2019/0031338 A1 | 1/2019 | McCullough et al. |
| 2019/0031339 A1 | 1/2019 | McCullough et al. |
| 2019/0031361 A1 | 1/2019 | McCullough et al. |
| 2019/0144108 A1 | 5/2019 | McCullough et al. |
| 2019/0263516 A1 | 8/2019 | McCullough et al. |
| 2019/0389573 A1 | 12/2019 | Kahou et al. |
| 2022/0316255 A1* | 10/2022 | Meilhan ................ B64C 1/1407 |

FOREIGN PATENT DOCUMENTS

| | | |
|---|---|---|
| CN | 111976971 A | 11/2020 |
| CN | 112278254 A * | 1/2021 |
| FR | 2977865 A3 | 1/2013 |
| GB | 587388 A | 4/1947 |
| GB | 618475 A | 2/1949 |
| GB | 654089 A | 6/1951 |
| WO | 2001074659 A1 | 10/2001 |
| WO | 2005039973 A2 | 5/2005 |
| WO | 2014067563 A1 | 5/2014 |

OTHER PUBLICATIONS

Bell and NASA Partner for UAV Development; Transportup.com; Sep. 9, 2018.

Bell APT—Automatic Pod Transport; SUASNEWS.com; Dec. 6, 2017.

Bell Autonomous Pod Transport; MONCH.com; May 2, 2018.

Duffy, et al., The LIFT! Project—Modular, Electric Vertical Lift System with Ground Power Tether, AHS 71st Annual Forum, Virginia Beach, Virginia, May 2015.

Kang, et al., Gap and Stagger Effects on Biplanes with End Plates, 47th AIAA Aerospace Sciences Meeting Including The New Horizons Forum and Aerospace Exposition, Orlando, Florida, Jan. 2009.

Munk, General Biplane Theory, National Advisory Committee for Aeronautics, Unknown Date.

Wolfe, Frank; Bell Moving to Scale Up Antonymous Delivery Drones for US Military; Rotor & Wing International; Sep. 27, 2018.

* cited by examiner

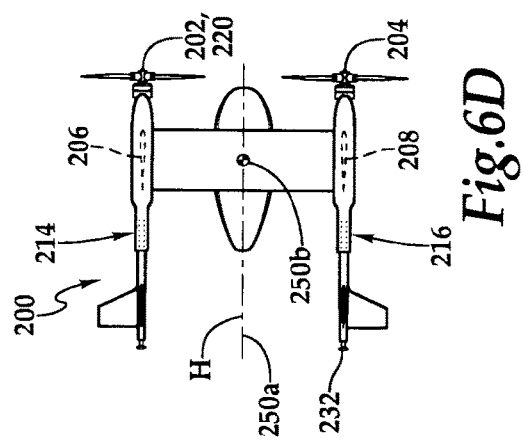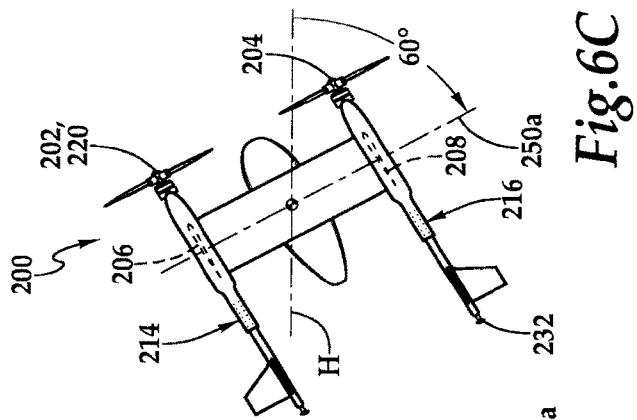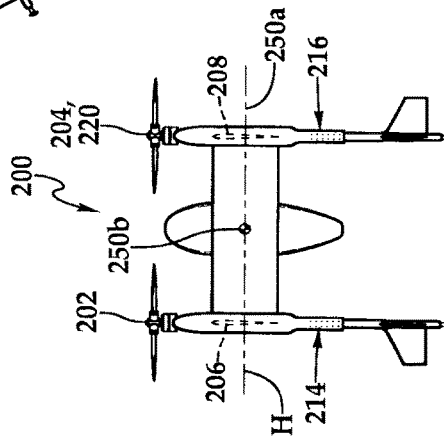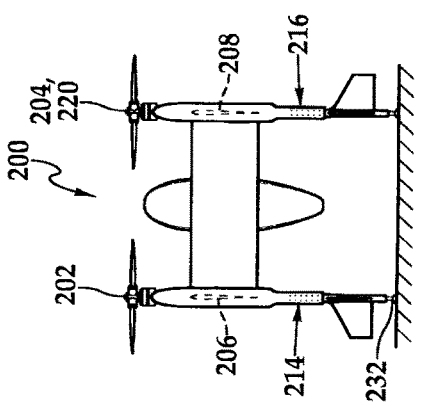

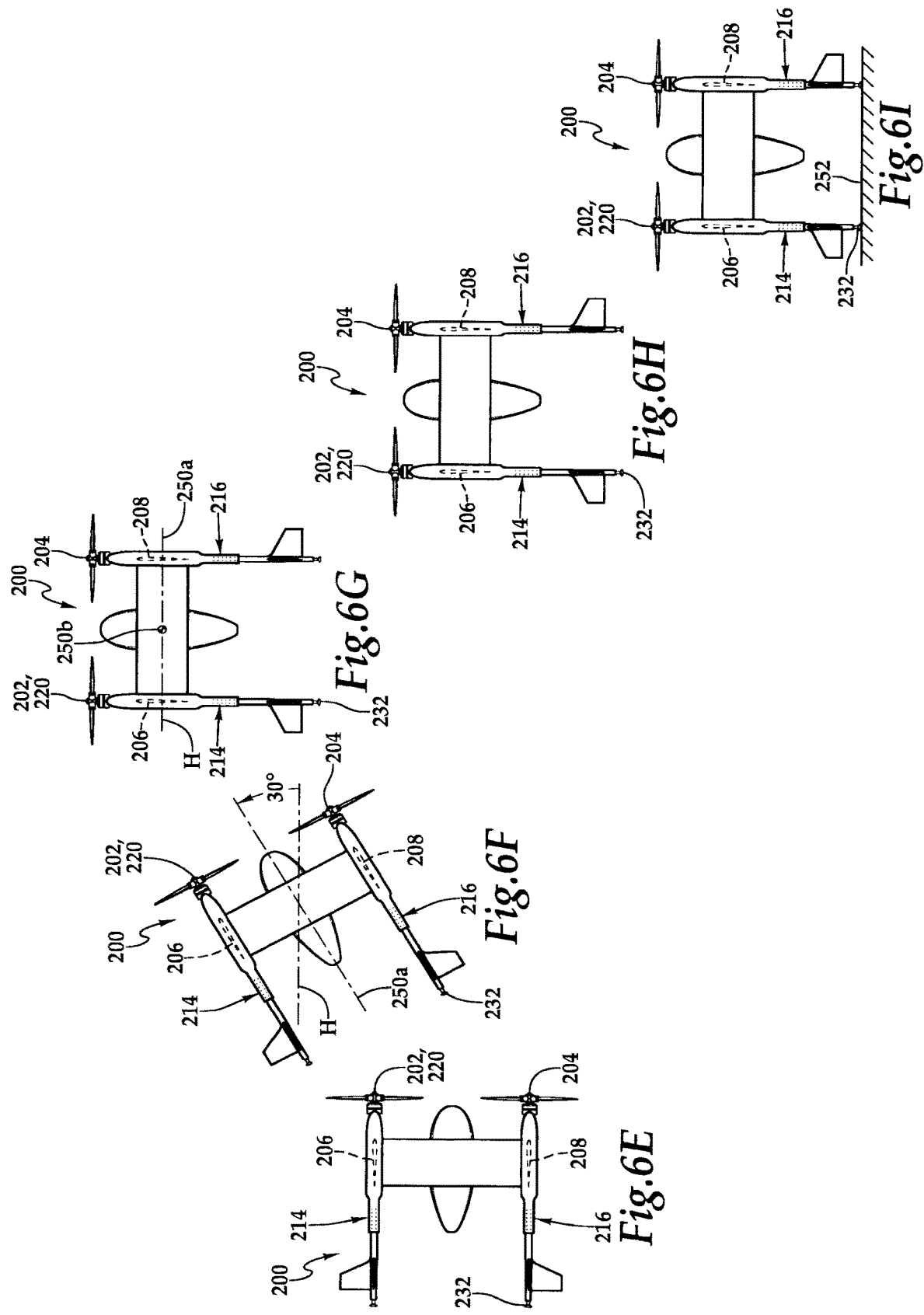

TELESCOPING TAIL ASSEMBLIES FOR USE ON AIRCRAFT

TECHNICAL FIELD OF THE DISCLOSURE

The present disclosure relates, in general, to aircraft configured to convert between thrust-borne lift in a VTOL orientation and wing-borne lift in a biplane orientation and, in particular, to aircraft having telescoping tail assemblies that slide into various positions including a retracted position and an extended position to adjust the overall length of the aircraft.

BACKGROUND

Fixed-wing aircraft, such as airplanes, are capable of flight using wings that generate lift responsive to the forward airspeed of the aircraft, which is generated by thrust from one or more jet engines or propellers. The wings generally have an airfoil cross section and generate a lifting force as the aircraft moves forward to support the aircraft in flight. Fixed-wing aircraft, however, typically require a runway that is hundreds or thousands of feet long for takeoff and landing. Unlike fixed-wing aircraft, vertical takeoff and landing (VTOL) aircraft do not require runways. Instead, VTOL aircraft are capable of taking off and landing vertically. Rotorcraft such as helicopters, tiltrotors, tiltwings, quadcopters, tailsitters and other multicopters are examples of VTOL aircraft. Each of these rotorcraft utilizes one or more rotors to provide lift and thrust to the aircraft. The rotors not only enable vertical takeoff and landing, but may also enable hover, forward flight, backward flight and lateral flight. These attributes make VTOL aircraft highly versatile for use in congested, isolated or remote areas. Some types of VTOL aircraft such as tailsitters, tiltrotors and tiltwings are convertible between a forward flight orientation, in which the rotors provide forward thrust with the forward airspeed of the VTOL aircraft allowing for wing-borne lift enabling the VTOL aircraft to have a high forward speed, and a VTOL orientation, in which the rotors provide thrust-borne lift. Unmanned aerial systems (UAS), also known as unmanned aerial vehicles (UAV) or drones, are self-powered fixed-wing or VTOL aircraft that do not carry a human operator, use aerodynamic forces to provide vehicle lift, are autonomously and/or remotely operated, may be expendable or recoverable and may carry lethal or nonlethal payloads. UAS may be used in military, commercial, scientific, recreational and other applications.

Both fixed-wing and VTOL aircraft can be subject to dimensional limitations. For example, the dimensions of maritime or amphibious aircraft may need to be optimized to fit within a given spotting factor or reduced to fit on a deck elevator. Some aircraft may be limited in maximum height due to factory or hangar door height constraints, while other aircraft may be limited in overall length to land on or take off from a given helipad. UAS present a unique sizing challenge in that many UAS are designed to be rapidly packaged, unpackaged and deployed from shipping containers or other small spaces, imposing severe limitations on their dimensions.

Short coupled aircraft, which may include fixed-wing aircraft, VTOL aircraft or UAS, may be employed to address the aforementioned sizing limitations as well as other dimensional constraints. Short coupled aircraft are aircraft with a relatively short distance between the wing and tailboom, empennage, tail assembly or other structure used to provide a force that orients the aircraft. Due to the short moment arm in such short coupled configurations, the tail structure is required to produce greater orientational control forces to avoid, for example, sensitivity to pilot-induced oscillation. Thus, short coupled aircraft often suffer from significant stability and control issues. In the example of twin engine aircraft, such stability and control issues commonly result in reduced directional stability and control, while for other classes of aircraft both longitudinal and directional stability and control may be adversely impacted. Accordingly, a need has arisen for aircraft configurations that facilitate flight stability and control without adversely impacting an aircraft's storage footprint and transportability.

SUMMARY

In a first aspect, the present disclosure is directed to a telescoping tail assembly for use on an aircraft having a fore-aft length. The telescoping tail assembly includes a housing extending in an aftward direction, a tailboom slidable along the housing into various positions including an extended position and a retracted position and one or more control surfaces coupled to the tailboom. The tailboom increases the fore-aft length of the aircraft in the extended position and decreases the fore-aft length of the aircraft in the retracted position.

In some embodiments, the housing may be an outer housing having an aft end forming a rear aperture and the tailboom may be an inner tailboom, the inner tailboom slidably receivable into the outer housing via the rear aperture. In other embodiments, the housing may be an inner housing and the tailboom may be an outer tailboom having a forward end forming a forward aperture, the inner housing slidably receivable into the outer tailboom via the forward aperture. In certain embodiments, the telescoping tail assembly may include an annular aft bearing interposed between the housing and the tailboom adjacent an aft end of the housing, the aft bearing configured to support the tailboom in the plurality of positions. In some embodiments, the telescoping tail assembly may include a limiter interposed between the housing and the tailboom, the limiter configured to limit the tailboom from extending past a predetermined extended position. In certain embodiments, the tailboom may have a forward end with an enlarged dimension configured to abut the limiter in the predetermined extended position. In some embodiments, the limiter may be an adjustable limiter movable and selectively lockable along a length of the housing to change the predetermined extended position of the tailboom. In certain embodiments, the housing may form a number of adjustment holes extending along the length of the housing and the limiter may form one or more pin receivers. In such embodiments, the telescoping tail assembly may include one or more adjustment pins receivable by the adjustment holes in the housing and the one or more pin receivers of the limiter to secure the limiter at a location along the length of the housing.

In some embodiments, the telescoping tail assembly may include one or more springs coupled to the housing and/or the tailboom configured to bias the tailboom toward the extended position. In certain embodiments, the one or more springs may include a tension spring having a forward end coupled to the tailboom and an aft end coupled to the housing, the tension spring biasing the tailboom toward the extended position. In such embodiments, the telescoping tail assembly may include a tensioning selector to adjust the tension of the tension spring. In some embodiments, the telescoping tail assembly may include a retainer interposed between the housing and the tailboom, the retainer having a disengaged position in which the tailboom is slidable between the various positions and an engaged position in which the tailboom is locked into the extended position. In such embodiments, the retainer may move from the disengaged position to the engaged position in response to the tailboom sliding aft of the retainer. In certain embodiments, the retainer may be movable and selectively lockable at locations along a length of the housing. In some embodiments, the retainer may include a base, a flap rotatably coupled to the base via a forward pivot joint and an aft pin spring interposed between the base and the flap configured to bias the flap into the engaged position. In certain embodiments, the telescoping tail assembly may include a jackscrew coupled to the tailboom and an actuator coupled to the jackscrew, the actuator configured to selectively rotate the jackscrew to translate the tailboom between the various positions.

In a second aspect, the present disclosure is directed to a propulsion assembly for an aircraft. The propulsion assembly has a fore-aft length and includes a nacelle, a rotor assembly coupled to the forward end of the nacelle and a telescoping tail assembly at the aft end of the nacelle. The telescoping tail assembly includes a housing extending in an aftward direction, a tailboom slidable along the housing into various positions including an extended position and a retracted position and one or more control surfaces coupled to the tailboom. The tailboom increases the fore-aft length of the propulsion assembly in the extended position and decreases the fore-aft length of the propulsion assembly in the retracted position.

In some embodiments, the propulsion assembly may include a landing foot coupled to the aft end of the tailboom. In certain embodiments, the telescoping tail assembly may include a forward retraction stop disposed forward of the tailboom configured to limit the tailboom from retracting past a predetermined retracted position.

In a third aspect, the present disclosure is directed to an aircraft operable to transition between thrust-borne lift in a VTOL orientation and wing-borne lift in a biplane orientation. The aircraft includes an airframe and a thrust array attached to the airframe. The thrust array includes a number of propulsion assemblies each having a fore-aft length. Each propulsion assembly includes a nacelle, a rotor assembly coupled to the forward end of the nacelle and a telescoping tail assembly at the aft end of the nacelle. The telescoping tail assembly includes a housing extending in an aftward direction, a tailboom slidable along the housing into various positions including an extended position and a retracted position and one or more control surfaces coupled to the tailboom. The tailbooms increase the fore-aft lengths of the propulsion assemblies in the extended position and decrease the fore-aft lengths of the propulsion assemblies in the retracted position.

In some embodiments, the tailbooms may slide from the retracted position to the extended position in response to a gravitational force experienced by the tailbooms during takeoff in the VTOL orientation and may slide from the extended position to the retracted position in response to landing on a surface in the VTOL orientation. In certain embodiments, the tailbooms may slide from the retracted position to the extended position in response to a drag force experienced by the tailbooms during flight.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 6A-6I are schematic illustrations of an aircraft with telescoping tail assemblies in a sequential flight operating scenario in accordance with embodiments of the present disclosure;

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Figure 1A:
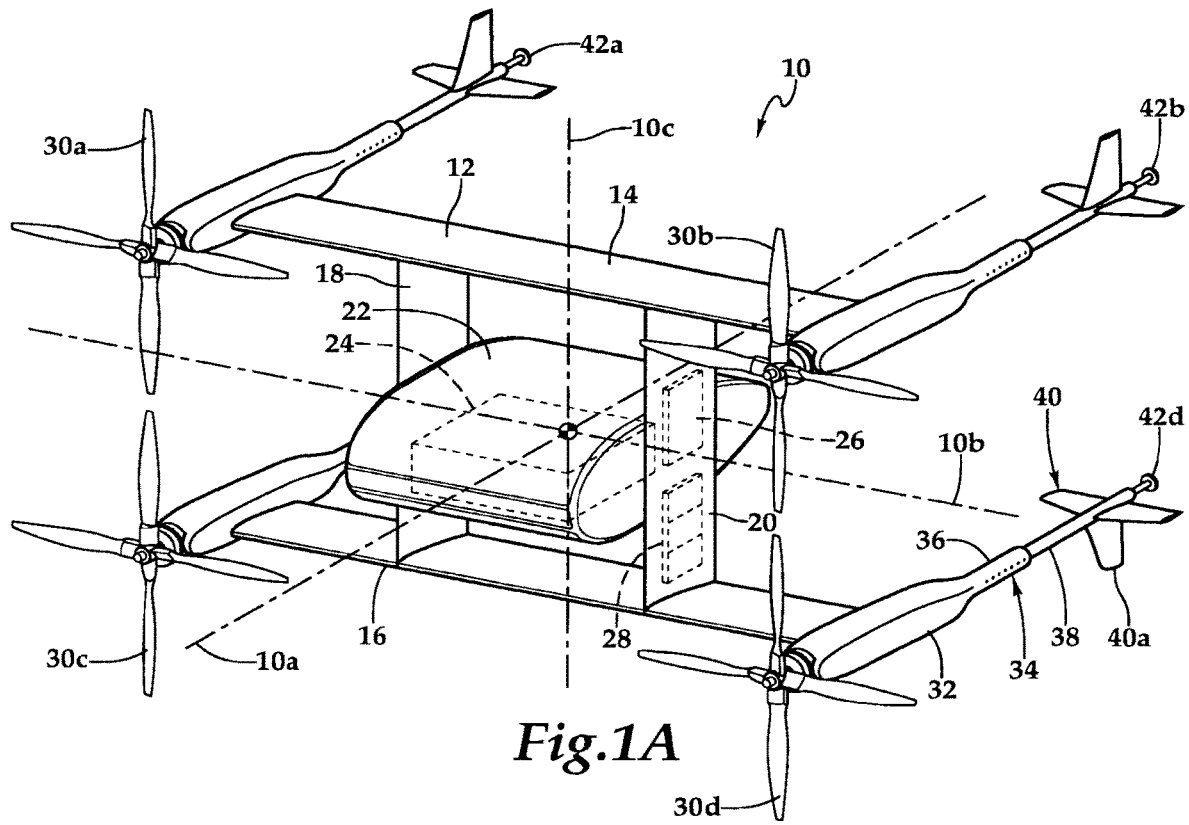
FIGS. 1A-1B are schematic illustrations of an aircraft with telescoping tail assemblies that is operable to convert between thrust-borne lift in a VTOL orientation and wing-borne lift in a biplane orientation in accordance with embodiments of the present disclosure.
Figure 1B:
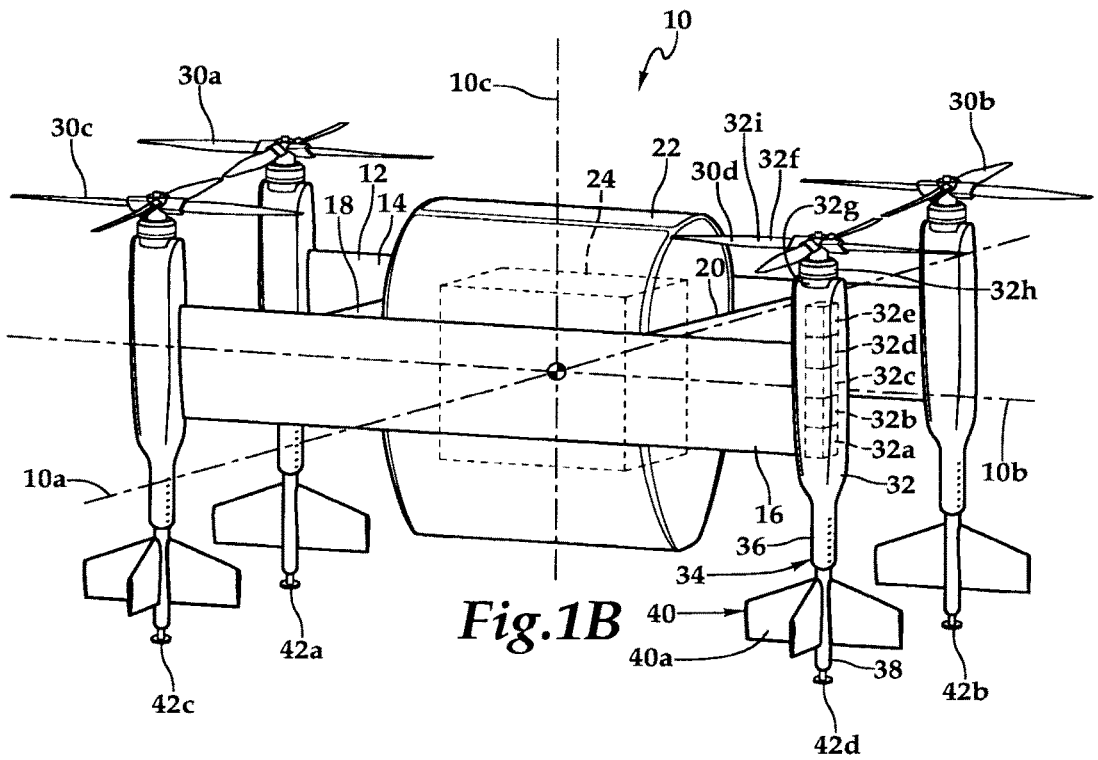

Referring to FIGS. 1A-1B in the drawings, isometric views of a tailsitter aircraft 10 with telescoping tail assemblies that is operable to transition between thrust-borne lift in a VTOL orientation and wing-borne lift in a biplane orientation are depicted. FIG. 1A depicts aircraft 10 in the biplane orientation wherein the propulsion assemblies provide forward thrust with the forward airspeed of aircraft 10 providing wing-borne lift enabling aircraft 10 to have a high speed and/or high endurance forward flight mode. FIG. 1B depicts aircraft 10 in the VTOL orientation wherein the propulsion assemblies provide thrust-borne lift. Aircraft 10 has a longitudinal axis 10a that may also be referred to as the roll axis, a lateral axis 10b that may also be referred to as the pitch axis and a vertical axis 10c that may also be referred to as the yaw axis. When longitudinal axis 10a and lateral axis 10b are both in a horizontal plane and normal to the local vertical in the earth's reference frame, aircraft 10 has a level flight attitude. In the illustrated embodiment, the length of aircraft 10 in the direction of lateral axis 10b is greater than the width of aircraft 10 in the direction of longitudinal axis 10a in the VTOL orientation of aircraft 10, as depicted in FIG. 1B. Both the magnitudes of the length and the width of aircraft 10 as well as the difference between the length and the width of aircraft 10 are important relative to the landing stability of aircraft 10 as well as the tip-over stability of aircraft 10 when aircraft 10 is positioned on a surface such as the ground in a tailsitter orientation.

In the illustrated embodiment, aircraft 10 has an airframe 12 including wings 14, 16 each having an airfoil cross-section that generates lift responsive to the forward airspeed of aircraft 10. Wings 14, 16 may be formed as single members or may be formed from multiple wing sections. The outer skins for wings 14, 16 are preferably formed from high strength and lightweight materials such as fiberglass, carbon, plastic, metal or other suitable material or combination of materials. In the biplane orientation of aircraft 10, wing 14 is an upper wing having a straight wing configuration and wing 16 is a lower wing having a straight wing configuration. In other embodiments, wings 14, 16 could have other designs such as anhedral and/or dihedral wing designs, swept wing designs or other suitable wing designs. In the illustrated embodiment, wings 14, 16 are substantially parallel with each other. Extending generally perpendicularly between wings 14, 16 are two truss structures depicted as pylons 18, 20. In other embodiments, more than two pylons may be present. Pylons 18, 20 are preferably formed from high strength and lightweight materials such as fiberglass, carbon, plastic, metal or other suitable material or combination of materials. In the illustrated embodiment, pylons 18, 20 are substantially parallel with each other.

Aircraft 10 includes a cargo pod 22 that is coupled between pylons 18, 20. Cargo pod 22 may be fixably or removably coupled to pylons 18, 20. In addition, in the coupled position, cargo pod 22 may be fixed, shiftable or rotatable relative to pylons 18, 20. Cargo pod 22 has an aerodynamic shape configured to minimize drag during high speed forward flight. Cargo pod 22 is preferably formed from high strength and lightweight materials such as fiberglass, carbon, plastic, metal or other suitable material or combination of materials. Cargo pod 22 has an interior region that may receive a payload 24 therein such as one or more packages. Aircraft 10 may autonomously transport and deliver payload 24 to a desired location, in which case aircraft 10 may be referred to as an unmanned aerial vehicle (UAV), an unmanned aerial system (UAS) or a drone. In other embodiments, aircraft 10 may not include cargo pod 22.

One or more of cargo pod 22, wings 14, 16 and/or pylons 18, 20 may contain flight control systems, energy sources, communication lines and other desired systems. For example, pylon 20 houses flight control system 26 of aircraft 10. Flight control system 26 is preferably a redundant digital flight control system including multiple independent flight control computers. For example, the use of a triply redundant flight control system 26 improves the overall safety and reliability of aircraft 10 in the event of a failure in flight control system 26. Flight control system 26 preferably includes non-transitory computer readable storage media including a set of computer instructions executable by one or more processors for controlling the operation of aircraft 10. Flight control system 26 may be implemented on one or more general-purpose computers, special purpose computers or other machines with memory and processing capability. For example, flight control system 26 may include one or more memory storage modules including, but not limited to, internal storage memory such as random access memory, non-volatile memory such as read only memory, removable memory such as magnetic storage memory, optical storage, solid-state storage memory or other suitable memory storage entities. Flight control system 26 may be a microprocessor-based system operable to execute program code in the form of machine-executable instructions. In addition, flight control system 26 may be selectively connectable to other computer systems via a proprietary encrypted network, a public encrypted network, the Internet or other suitable communication network that may include both wired and wireless connections.

One or more of cargo pod 22, wings 14, 16 and/or pylons 18, 20 may contain one or more electrical power sources depicted as a plurality of batteries 28 in pylon 20. Batteries 28 supply electrical power to flight control system 26, the distributed thrust array of aircraft 10 and/or other power consumers of aircraft 10 such that aircraft 10 may be referred to as an electric vertical takeoff and landing (eVTOL) aircraft. In other embodiments, aircraft 10 may have a hybrid power system that includes one or more internal combustion engines and an electric generator. Preferably, the electric generator is used to charge batteries 28. In other embodiments, the electric generator may provide power directly to a power management system and/or the power consumers of aircraft 10. In still other embodiments, aircraft 10 may use fuel cells as the electrical power source.

Cargo pod 22, wings 14, 16 and/or pylons 18, 20 also contain a wired and/or wireless communication network that enables flight control system 26 to communicate with the distributed thrust array of aircraft 10. In the illustrated embodiment, aircraft 10 has a two-dimensional distributed thrust array that is coupled to airframe 12. As used herein, the term "two-dimensional thrust array" refers to a plurality of thrust generating elements that occupy a two-dimensional space in the form of a plane. A minimum of three thrust generating elements is required to form a "two-dimensional thrust array." A single aircraft may have more than one "two-dimensional thrust array" if multiple groups of at least three thrust generating elements each occupy separate two-dimensional spaces thus forming separate planes. As used herein, the term "distributed thrust array" refers to the use of multiple thrust generating elements each producing a portion of the total thrust output. The use of a "distributed thrust array" provides redundancy to the thrust generation capabilities of the aircraft including fault tolerance in the event of the loss of one of the thrust generating elements. A "distributed thrust array" can be used in conjunction with a "distributed power system" in which power to each of the thrust generating elements is supplied by a local power system instead of a centralized power source. For example, in a "distributed thrust array" having a plurality of propulsion assemblies acting as the thrust generating elements, a "distributed power system" may include individual battery elements housed within the nacelle of each propulsion assembly.

The two-dimensional distributed thrust array of aircraft 10 includes a plurality of propulsion assemblies, individually denoted as 30a, 30b, 30c, 30d and collectively referred to as propulsion assemblies 30. In the illustrated embodiment, propulsion assemblies 30a, 30b are coupled at the wingtips of wing 14 and propulsion assemblies 30c, 30d are coupled at the wingtips of wing 16. By positioning propulsion assemblies 30a, 30b, 30c, 30d at the wingtips of wings 14, 16, the thrust and torque generating elements are positioned at the maximum outboard distance from the center of gravity of aircraft 10 located, for example, at the intersection of axes 10a, 10b, 10c. The outboard locations of propulsion assemblies 30 provide dynamic stability to aircraft 10 in hover and a high dynamic response in the VTOL orientation of aircraft 10 enabling efficient and effective pitch, yaw and roll control by changing the thrust, thrust vector and/or torque output of certain propulsion assemblies 30 relative to other propulsion assemblies 30.

Even though the illustrated embodiment depicts four propulsion assemblies, the distributed thrust array of aircraft 10 could have other numbers of propulsion assemblies both greater than or less than four. Also, even though the illustrated embodiment depicts propulsion assemblies 30 in a wingtip mounted configuration, the distributed thrust array of aircraft 10 could have propulsion assemblies coupled to the wings and/or pylons in other configurations such as mid-span configurations. Further, even though the illustrated embodiment depicts propulsion assemblies 30 in a mid-wing configuration, the distributed thrust array of aircraft 10 could have propulsion assemblies coupled to the wings in a low wing configuration, a high wing configuration or any combination or permutation thereof. In the illustrated embodiment, propulsion assemblies 30 are variable speed propulsion assemblies having fixed pitch rotor blades and thrust vectoring capability. Depending upon the implementation, propulsion assemblies 30 may have longitudinal thrust vectoring capability, lateral thrust vectoring capability or omnidirectional thrust vectoring capability. In other embodiments, propulsion assemblies 30 may operate as single speed propulsion assemblies, may have variable pitch rotor blades and/or may be non-thrust vectoring propulsion assemblies.

Propulsion assemblies 30 may be independently attachable to and detachable from airframe 12 and may be standardized and/or interchangeable units and preferably line replaceable units (LRUs) providing easy installation and removal from airframe 12. The use of line replaceable propulsion units is beneficial in maintenance situations if a fault is discovered with one of the propulsion assemblies. In this case, the faulty propulsion assembly 30 can be decoupled from airframe 12 by simple operations and another propulsion assembly 30 can then be attached to airframe 12. In other embodiments, propulsion assemblies 30 may be permanently coupled to wings 14, 16.

Referring to FIG. 1B, component parts of propulsion assembly 30d will now be described. It is noted that propulsion assembly 30d is representative of each propulsion assembly 30 therefore, for sake of efficiency, certain features have been disclosed only with reference to propulsion assembly 30d. One having ordinary skill in the art, however, will fully appreciate an understanding of each propulsion assembly 30 based upon the disclosure herein of propulsion assembly 30d. In the illustrated embodiment, propulsion assembly 30d includes a nacelle 32 that houses components including a battery 32a, an electronic speed controller 32b, one or more actuators 32c, an electronics node 32d, one or more sensors 32e and other desired electronic equipment. In some embodiments, electronics node 32d may include battery 32a, electronic speed controller 32b and sensors 32e. The forward end of nacelle 32 supports a propulsion system 32f including a gimbal 32g, a variable speed electric motor 32h and a rotor assembly 32i.

Flight control system 26 communicates via a wired communications network within airframe 12 with electronics nodes 32d of propulsion assemblies 30. Flight control system 26 receives sensor data from sensors 32e and sends flight command information to the electronics nodes 32d such that each propulsion assembly 30 may be individually and independently controlled and operated. For example, flight control system 26 is operable to individually and independently control the speed and the thrust vector of each propulsion system 32f. Flight control system 26 may autonomously control some or all aspects of flight operation for aircraft 10. Flight control system 26 is also operable to communicate with remote systems, such as a ground station via a wireless communications protocol. The remote system may be operable to receive flight data from and provide commands to flight control system 26 to enable remote flight control over some or all aspects of flight operation for aircraft 10.

Because aircraft 10 may be subject to sizing and operational constraints, aircraft 10 may have dimensions consistent with that of a short coupled aircraft. Due to the short moment arm in certain short coupled configurations, the tail structure in such configurations may be required to produce greater orientational control forces to avoid, for example, sensitivity to pilot-induced oscillation. Thus, short coupled aircraft often suffer from stability and control issues. To address these and other issues presented by short coupled aircraft, the aft end of nacelle 32 includes a telescoping tail assembly 34 that is slidable to change the fore-aft length of both aircraft 10 and propulsion assembly 30d to adapt to the changing flight, transport and storage requirements of aircraft 10. Telescoping tail assembly 34 has a tube-in-tube telescoping configuration that includes an outer housing 36 and an inner tailboom 38. FIG. 1A shows the telescoping tail assemblies of propulsion assemblies 30a, 30b, 30c, 30d in the extended position, which may be more suitable for forward flight. FIG. 1B shows the telescoping tail assemblies of propulsion assemblies 30a, 30b, 30c, 30d in the retracted position, which may be more suitable in the VTOL orientation for takeoff, landing, storage, transport and/or maintenance. It will be appreciated, however, that the telescoping tail assemblies may also be in the extended position in the VTOL orientation and the retracted position in the forward flight orientation depending on the particular needs of the operation. The telescoping tail assemblies may also be in an intermediate position between the illustrated extended and retracted positions for either or both of the forward flight and VTOL orientations. While the illustrated embodiment shows telescoping tail assembly 34 on the aft end of nacelle 32, in other embodiments one or more telescoping tail assemblies may be coupled to wings 14, 16, pylons 18, 20 or any other portion of airframe 12.

Extending from inner tailboom 38 of telescoping tail assembly 34 is a tail assembly 40 that includes one or more aerosurfaces 40a. In the illustrated embodiment, aerosurfaces 40a include stationary horizontal and vertical stabilizers. In other embodiments, aerosurfaces 40a may be active aerosurfaces that serve as elevators to control the pitch or angle of attack of wings 14, 16 and/or ailerons to control the roll or bank of aircraft 10 in the biplane orientation of aircraft 10. Because aerosurfaces 40a are coupled to inner tailboom 38, the distance between aerosurfaces 40a and wings 14, 16 may be changed based on the position of telescoping tail assembly 34, allowing, for example, greater orientational control of aircraft 10 in forward flight by extending the telescoping tail assemblies of propulsion assemblies 30. Aerosurfaces 40a also serve to enhance hover stability in the VTOL orientation of aircraft 10.

Aircraft 10 has a landing gear assembly 42 that includes a plurality of landing feet depicted as landing foot 42a coupled to a lower or aft end of propulsion assembly 30a, landing foot 42b coupled to a lower or aft end of propulsion assembly 30b, landing foot 42c coupled to a lower or aft end of propulsion assembly 30c and landing foot 42d coupled to a lower or aft end of propulsion assembly 30d. More particularly, landing feet 42a, 42b, 42c, 42d are each coupled to a respective inner tailboom of the telescoping tail assemblies of propulsion assemblies 30. By positioning landing feet 42a, 42b, 42c, 42d at the lower end of wingtip mounted propulsion assemblies 30, landing feet 42a, 42b, 42c, 42d are positioned at the maximum outboard distance from the center of gravity of aircraft 10 located, for example, at the intersection of axes 10a, 10b, 10c, which provides for maximum landing stability and tip-over stability for aircraft 10.

It should be appreciated that aircraft 10 is merely illustrative of a variety of aircraft that can implement the embodiments disclosed herein. Indeed, the telescoping tail assemblies of the illustrative embodiments may be implemented on any aircraft. Other aircraft implementations can include helicopters, hybrid aircraft, compound helicopters, tiltwing aircraft, tiltrotor aircraft, quad tiltrotor aircraft, gyrocopters, propeller-driven airplanes and the like. As such, those skilled in the art will recognize that the telescoping tail assemblies of the illustrative embodiments can be integrated into a variety of aircraft configurations. It should be appreciated that even though aircraft are particularly well-suited to implement the embodiments of the present disclosure, non-aircraft vehicles and devices can also implement the embodiments.

Figure 2:
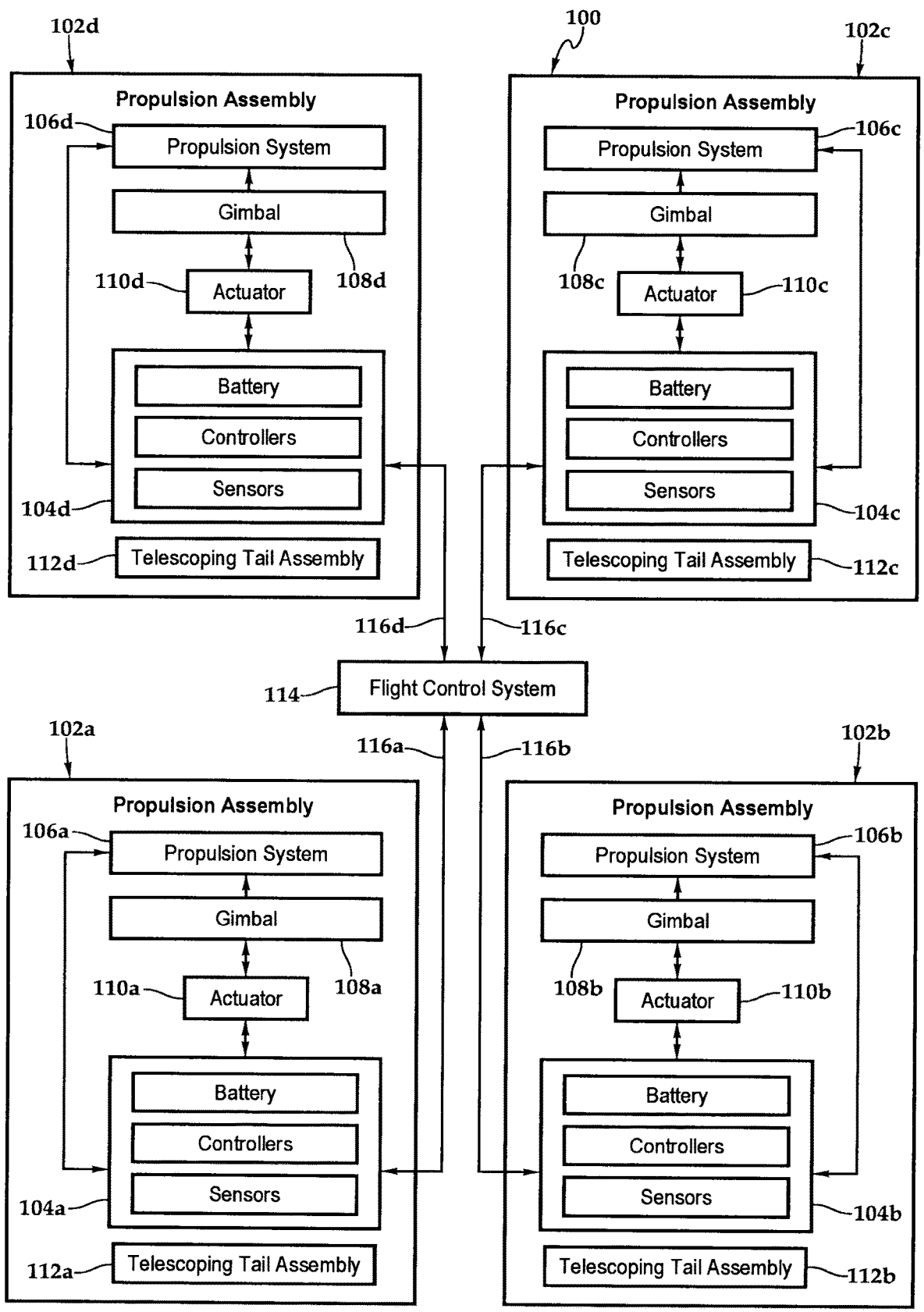
FIG. 2 is a block diagram of one implementation of a thrust array and a flight control system for an aircraft having telescoping tail assemblies in accordance with embodiments of the present disclosure.

Referring next to FIG. 2, a block diagram illustrates one implementation of a propulsion and flight control system for an aircraft 100 that is representative of aircraft 10 discussed herein. Specifically, aircraft 100 includes four propulsion assemblies 102a, 102b, 102c, 102d that form a two-dimensional thrust array of thrust vectoring propulsion assemblies. Propulsion assembly 102a includes various electronic components 104a including one or more batteries, one or more controllers and one or more sensors. Propulsion assembly 102a also includes a propulsion system 106a described herein as including an electric motor and a rotor assembly. In the illustrated embodiment, propulsion assembly 102a includes a two-axis gimbal 108a operated by one or more actuators 110a. In other embodiments, propulsion assembly 102a may include a single-axis gimbal or other mechanism for thrust vectoring. In still other embodiments, propulsion assembly 102a may be a non-thrust vectoring propulsion assembly. Propulsion assembly 102a includes telescoping tail assembly 112a configured to lengthen or shorten propulsion assembly 102a based on the operational needs of aircraft 100.

Propulsion assembly 102b includes an electronics node 104b depicted as including one or more batteries, one or more controllers and one or more sensors. Propulsion assembly 102b also includes a propulsion system 106b, a two-axis gimbal 108b operated by one or more actuators 110b and a telescoping tail assembly 112b. Propulsion assembly 102c includes an electronics node 104c depicted as including one or more batteries, one or more controllers and one or more sensors. Propulsion assembly 102c also includes a propulsion system 106c, a two-axis gimbal 108c operated by one or more actuators 110c and a telescoping tail assembly 112c. Propulsion assembly 102d includes an electronics node 104d depicted as including one or more batteries, one or more controllers and one or more sensors. Propulsion assembly 102d also includes a propulsion system 106d, a two-axis gimbal 108d operated by one or more actuators 110d and a telescoping tail assembly 112d.

Flight control system 114 is operably associated with each of propulsion assemblies 102a, 102b, 102c, 102d and is linked to electronics nodes 104a, 104b, 104c, 104d by a fly-by-wire communications network depicted as arrows 116a, 116b, 116c, 116d. Flight control system 114 receives sensor data from and sends commands to propulsion assemblies 102a, 102b, 102c, 102d to enable flight control system 114 to independently control each of propulsion assemblies 102a, 102b, 102c, 102d, as discussed herein.

Figure 3:
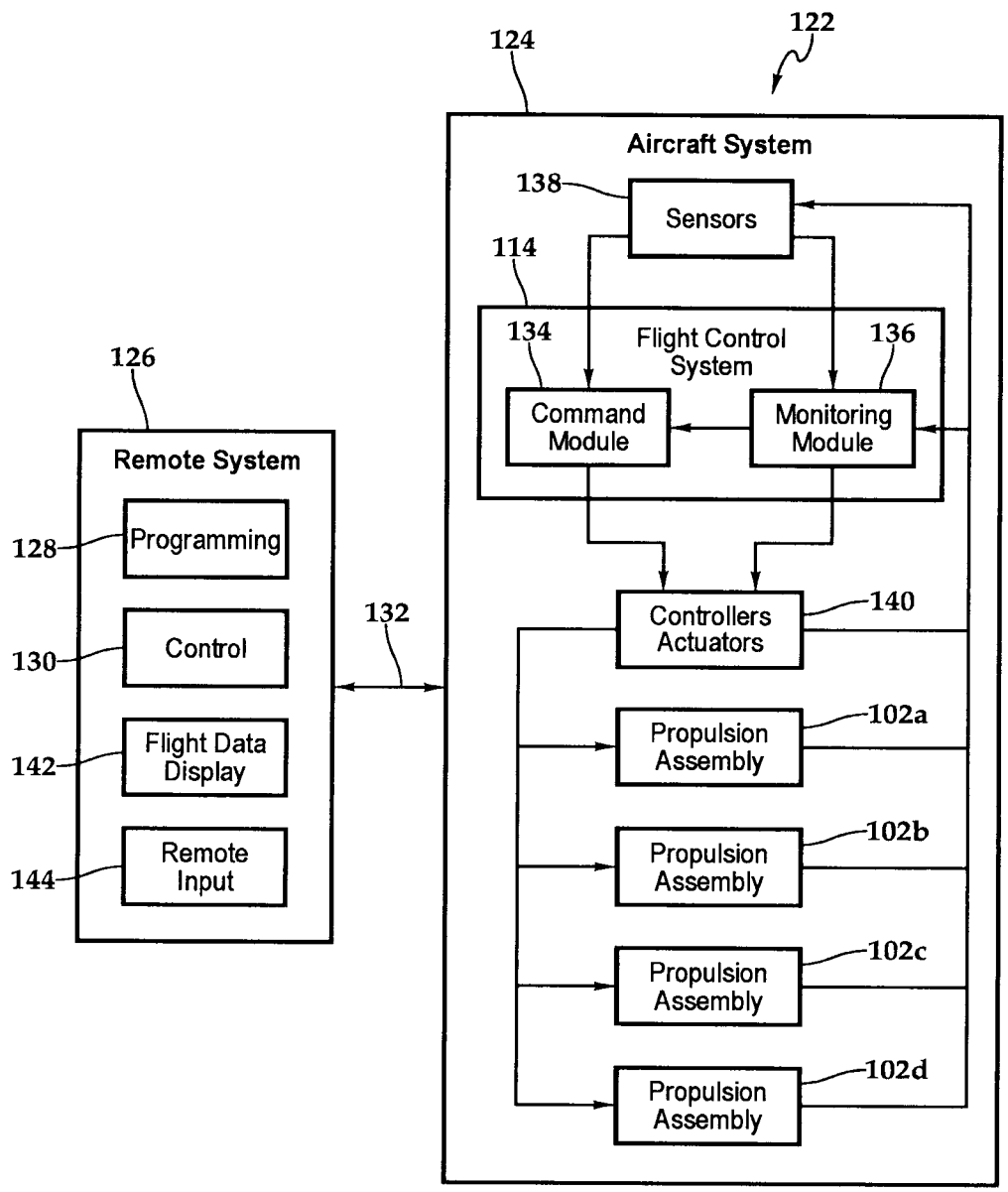
FIG. 3 is a block diagram of autonomous and remote control systems for an aircraft having telescoping tail assemblies in accordance with embodiments of the present disclosure.

Referring additionally to FIG. 3 in the drawings, a block diagram depicts a control system 122 operable for use with aircraft 100 or aircraft 10 of the present disclosure. In the illustrated embodiment, system 122 includes two primary computer based subsystems; namely, an aircraft system 124 and a remote system 126. In some implementations, remote system 126 includes a programming application 128 and a remote control application 130. Programming application 128 enables a user to provide a flight plan and mission information to aircraft 100 such that flight control system 114 may engage in autonomous control over aircraft 100. For example, programming application 128 may communicate with flight control system 114 over a wired or wireless communication channel 132 to provide a flight plan including, for example, a starting point, a trail of waypoints and an ending point such that flight control system 114 may use waypoint navigation during the mission. In addition, programming application 128 may provide one or more tasks to flight control system 114 for aircraft 100 to accomplish during the mission such as delivery of a payload to a desired location. Following programming, aircraft 100 may operate autonomously responsive to commands generated by flight control system 114.

In the illustrated embodiment, flight control system 114 includes a command module 134 and a monitoring module 136. It is to be understood by those skilled in the art that these and other modules executed by flight control system 114 may be implemented in a variety of forms including hardware, software, firmware, special purpose processors and/or combinations thereof. Flight control system 114 receives input from a variety of sources including internal sources such as sensors 138, controllers/actuators 140, propulsion assemblies 102a, 102b, 102c, 102d as well as external sources such as remote system 126, global positioning system satellites or other location positioning systems and the like. Propulsion assemblies 102a, 102b, 102c, 102d each include a telescoping tail assembly.

During the various operating modes of aircraft 100 such as the vertical takeoff flight mode, the hover flight mode, the forward flight mode, transition flight modes and the vertical landing flight mode, command module 134 provides commands to controllers/actuators 140. These commands enable independent operation of propulsion assemblies 102a, 102b, 102c, 102d including rotor speed, thrust vector and the like. Flight control system 114 receives feedback from controllers/actuators 140 and propulsion assemblies 102a, 102b, 102c, 102d. This feedback is processed by monitoring module 136 that can supply correction data and other information to command module 134 and to controllers/actuators 140. Sensors 138, such as an attitude and heading reference system (AHRS) with solid-state or microelectromechanical systems (MEMS), gyroscopes, accelerometers and magnetometers as well as other sensors including positioning sensors, speed sensors, environmental sensors, fuel sensors, temperature sensors, location sensors and the like also provide information to flight control system 114 to further enhance autonomous control capabilities.

Some or all of the autonomous control capability of flight control system 114 can be augmented or supplanted by remote flight control from, for example, remote system 126. Remote system 126 may include one or computing systems that may be implemented on general-purpose computers, special purpose computers or other machines with memory and processing capability. The computing systems may be microprocessor-based systems operable to execute program code in the form of machine-executable instructions. In addition, the computing systems may be connected to other computer systems via a proprietary encrypted network, a public encrypted network, the Internet or other suitable communication network that may include both wired and wireless connections. Remote system 126 communicates with flight control system 114 via communication link 132 that may include both wired and wireless connections.

While operating remote control application 130, remote system 126 is configured to display information relating to one or more aircraft of the present disclosure on one or more flight data display devices 142. Display devices 142 may be configured in any suitable form, including, for example, liquid crystal displays, light emitting diode displays, augmented displays or any suitable type of display. Remote system 126 may also include audio output and input devices such as a microphone, speakers and/or an audio port allowing an operator to communicate with other operators or a base station. Display device 142 may also serve as a remote input device 144 if a touch screen display implementation is used, however, other remote input devices, such as a keyboard or joystick, may alternatively be used to allow an operator to provide control commands to an aircraft being operated responsive to remote control.

Figure 4A:
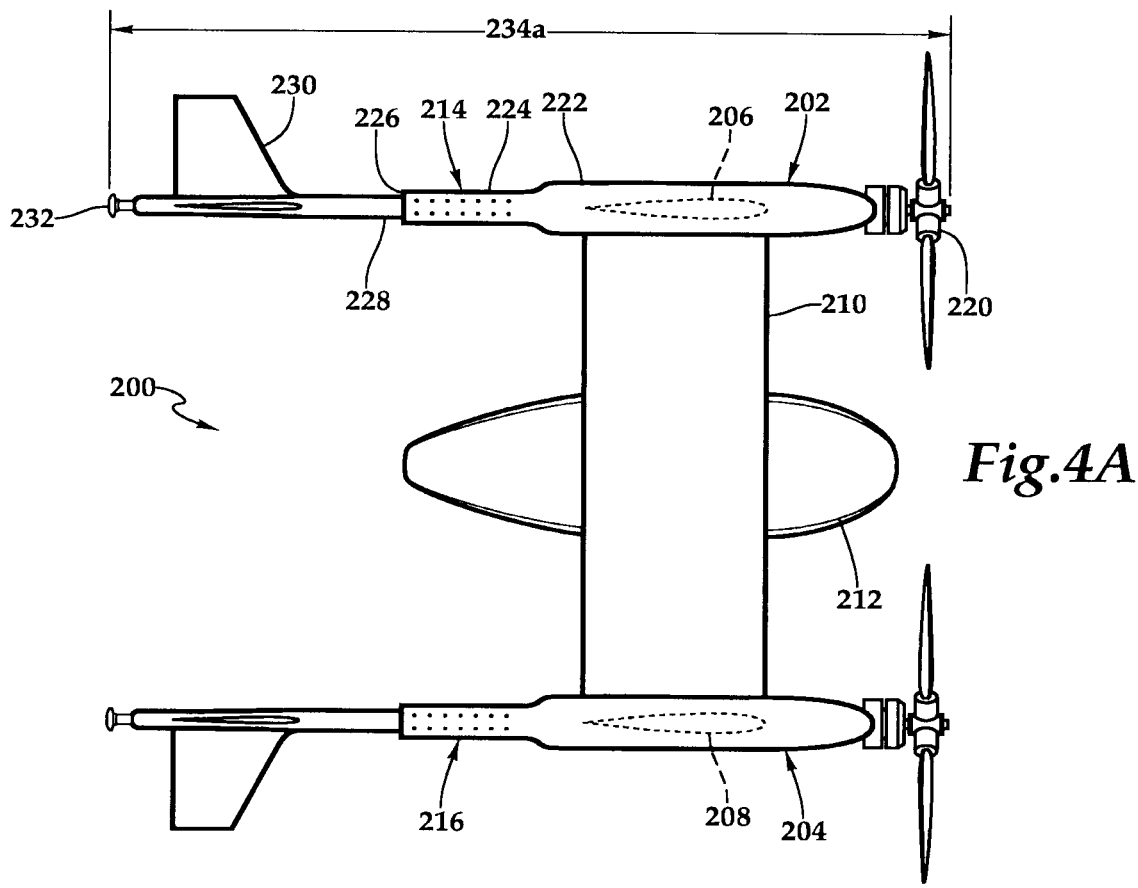
FIGS. 4A-4B are side views of an aircraft with telescoping tail assemblies in extended and retracted positions in accordance with embodiments of the present disclosure.
Figure 4B:
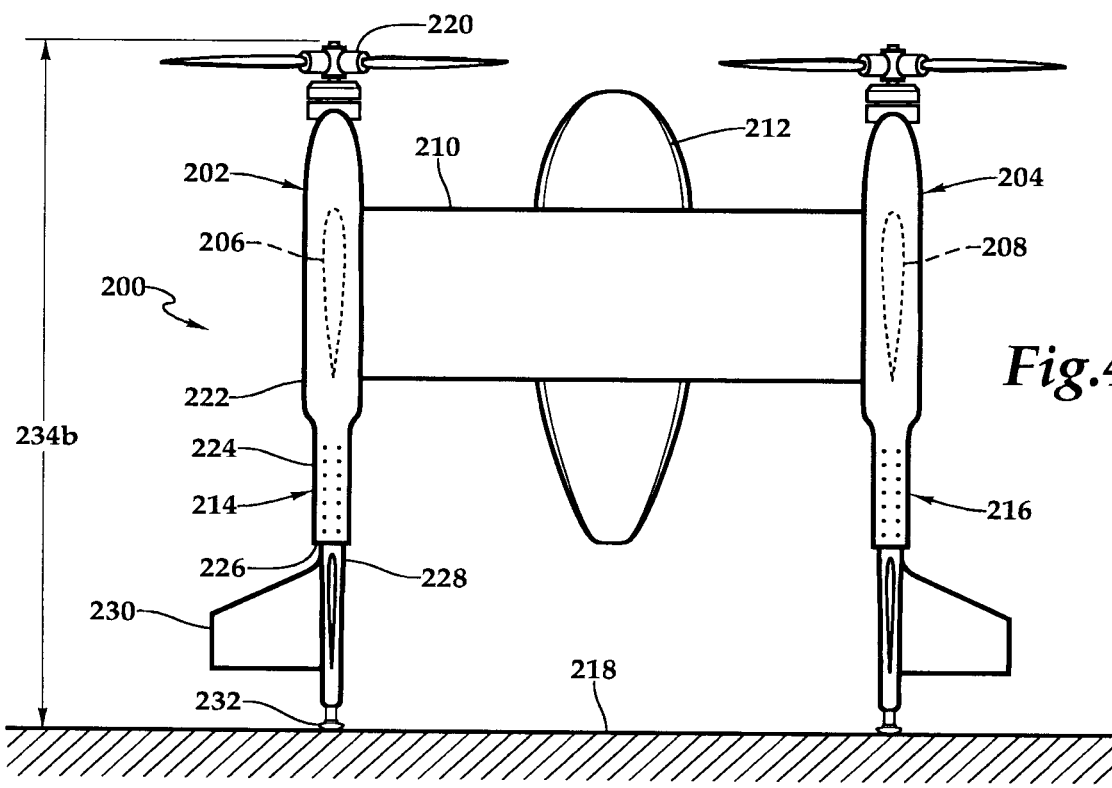

Referring to FIGS. 4A-4B in the drawings, a tailsitter aircraft with telescoping tail assemblies is schematically illustrated and generally designated 200 and which is representative of aircraft 10. Propulsion assemblies 202, 204 are coupled to wings 206, 208, respectively, which are coupled to pylon 210. Cargo pod 212 is supported in part by pylon 210. Propulsion assemblies 202, 204 each include a respective telescoping tail assembly 214, 216. In FIG. 4A, telescoping tail assemblies 214, 216 are in the extended position. In FIG. 4B, aircraft 200 is vertically landed on surface 218 and the weight of aircraft 200 compresses telescoping tail assemblies 214, 216 into the retracted position. Propulsion assembly 202 is substantially similar to propulsion assembly 204 and the other propulsion assemblies of aircraft 200 therefore, for sake of efficiency, certain features will be disclosed only with regard to propulsion assembly 202. One having ordinary skill in the art, however, will fully appreciate an understanding of propulsion assembly 204 and the other propulsion assemblies of aircraft 200 based upon the disclosure herein of propulsion assembly 202.

Rotor assembly 220 is coupled to the forward end of nacelle 222. Telescoping tail assembly 214, which is at the opposite, aft end of nacelle 222, includes outer housing 224. Outer housing 224 extends in an aftward direction and has an aft end forming a rear aperture 226. Inner tailboom 228 is slidably receivable into the inner cavity, or hollow, formed by outer housing 224 via rear aperture 226. Inner tailboom 228 is slidable into various positions including the extended position shown in FIG. 4A, the retracted position shown in FIG. 4B and intermediate positions therebetween. Various devices are coupled to inner tailboom 228 including control surfaces 230, which may be passive or active control surfaces that provide orientational control for aircraft 200. Landing foot 232 is coupled to the aft end of inner tailboom 228 to provide an interface with which to land aircraft 200 on surface 218. Aircraft 200 and propulsion assembly 202 each have an adjustable fore-aft length 234a, 234b. Aircraft 200 and propulsion assembly 202 have an increased fore-aft length 234a when inner tailboom 228 is in the extended position as shown in FIG. 4A and have a decreased fore-aft length 234b when inner tailboom 228 is in the retracted position as shown in FIG. 4B. Thus, telescoping tail assemblies 214, 216 may be extended or retracted to adjust the length of aircraft 200 and/or propulsion assemblies 202, 204 to suit the various operations of aircraft 200.

Figure 5A:
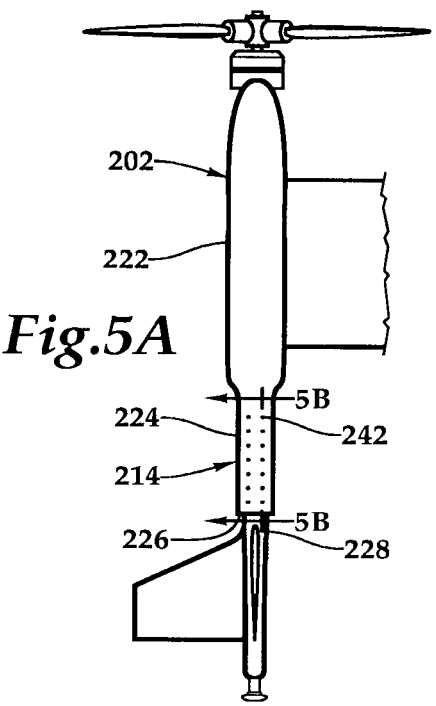
FIGS. 5A-5D are various views of a telescoping tail assembly having an outer housing and an inner tailboom in accordance with embodiments of the present disclosure.
Figure 5C:
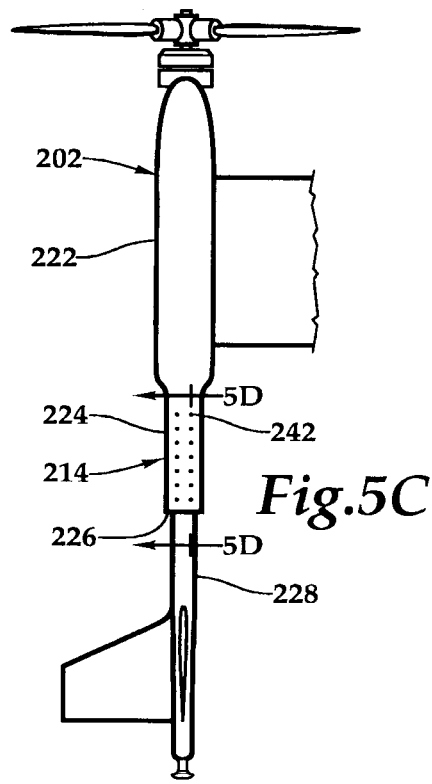
Figure 5B:
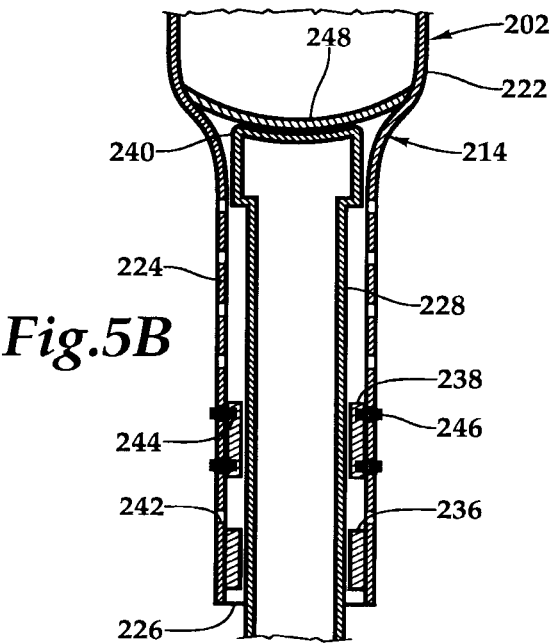
Figure 5D:
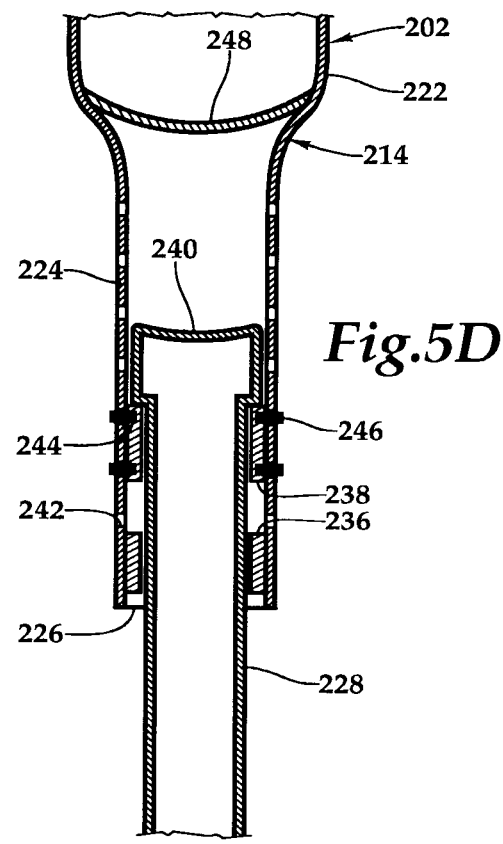

Referring additionally to FIG. 5A-5D in the drawings, additional views of telescoping tail assembly 214 of propulsion assembly 202 in the retracted and extended positions are depicted. More particularly, FIGS. 5A-5B show telescoping tail assembly 214 in the retracted position and FIGS. 5C-5D show telescoping tail assembly 214 in the extended position. Both outer housing 224 and inner tailboom 228 are cylindrical such that each form a circular cross-sectional shape with outer housing 224 having a larger diameter than inner tailboom 228. In other embodiments, outer housing 224 and inner tailboom 228 may have other complementary cross-sectional shapes such as a polygon, square, ellipse or irregular shape.

Telescoping tail assembly 214 includes aft bearing 236 interposed between outer housing 224 and inner tailboom 228 adjacent rear aperture 226. Aft bearing 236 supports inner tailboom 228 in various positions including the retracted, extended and intermediate positions by, for example, taking or absorbing bending, tail balancing and/or maneuvering loads. Aft bearing 236 alleviates loads experienced by telescoping tail assembly 214 and transfers such loads to surrounding structure. In the illustrated embodiment, aft bearing 236 is an annular aft bearing and may be, for example, a duplex bearing. In other embodiments, aft bearing 236 may be formed from a plurality of load bearing blocks or other structures. While FIGS. 5B and 5D show aft bearing 236 as being permanently set near rear aperture 226, in other embodiments, aft bearing 236 may be permanently located elsewhere along the length of outer housing 224 or may be movable along the length of outer housing 224.

Telescoping tail assembly 214 also includes a limiter, or stop-lock, 238 interposed between outer housing 224 and inner tailboom 228 forward of aft bearing 236. Limiter 238 limits inner tailboom 228 from extending past a predetermined extended position. Limiter 238 may have any shape that is adapted to prevent the aftward movement of inner tailboom 228 such as an annular shape. Limiter 238 may also be formed from a plurality of blocks or other structures. Forward end 240 of inner tailboom 228 has an enlarged dimension, namely an enlarged diameter in the illustrated embodiment, that causes forward end 240 of inner tailboom 228 to abut limiter 238 as inner tailboom 228 extends aftward toward the extended position.

Limiter 238 is movable and selectively lockable along the length of outer housing 224 so that the predetermined extended position into which inner tailboom 228 is extendable may be adjusted by an operator of aircraft 200. A number of alternative stop locations for limiter 238 along the length of outer housing 224 are provided by telescoping tail assembly 214 to provide for a customized in-flight tailboom position. More particularly, outer housing 224 forms adjustment holes 242 extending along the length of outer housing 224 and limiter 238 forms pin receivers 244. Adjustment pins 246 are received by both adjustment holes 242 in outer housing 224 and pin receivers 244 in limiter 238 to secure limiter 238 at a desired location along the length of outer housing 224. Adjustment pins 246 may be push pins that are pushed inward to allow longitudinal movement of limiter 238 or alternatively may be removable pins that are pulled out of pin receivers 244 to allow longitudinal movement of limiter 238 and inserted back into pin receivers 244 to lock limiter 238 into a desired position. At one extreme, limiter 238 may be locked into a forward-most position such that inner tailboom 228 is nonextendable. At the other extreme, limiter 238 may be removed altogether such that inner tailboom 228 extends all the way to aft bearing 236 with the forward end 240 of inner tailboom 228 abutting aft bearing 236 in the extended position. Using adjustment pins 246, limiter 238 may be optimally positioned for anticipated loading or center of gravity conditions. For example, more of inner tailboom 228 may be deployed in the predetermined extended position to achieve a center of gravity that is further aft while retaining a stable design.

Telescoping tail assembly 214 also includes a forward retraction stop 248 disposed forward of inner tailboom 228 to limit inner tailboom 228 from retracting past a predetermined retracted position. In addition to limiting the amount by which inner tailboom 228 may retract, forward retraction stop 248 may also protect components inside of nacelle 222. While forward retraction stop 248 is illustrated as having a permanent location inside nacelle 222, in other embodiments forward retraction stop 248 may be movable and lockable along the length of outer housing 224 in a similar manner as limiter 238. Telescoping tail assembly 214 is illustrated as having a tube-in-tube design, although in other embodiments telescoping tail assembly 214 may include multiple telescoping segments with intermediate telescoping tubes between the inner-most and outer-most tubes. In yet other embodiments, inner tailboom 228 may be hollow and have a larger diameter than outer housing 224 such that inner tailboom 228 slides along the outer surface of outer housing 224. Telescoping tail assembly 214 is tailorable to enable a wide breadth of loading conditions and may be particularly useful for aircraft having a high angle of attack since the fore-aft length of such aircraft may be increased by extending telescoping tail assembly 214, thus improving trim and angle of attack. The retractability of telescoping tail assembly 214 is advantageous for storability, transportability and ease of maintenance.

Referring additionally to FIGS. 6A-6I in the drawings, a sequential flight-operating scenario of aircraft 200 including telescoping tail assemblies 214, 216 is depicted. As best seen in FIG. 6A, aircraft 200 is in a tailsitter position on a surface such as the ground, a helipad or the deck of an aircraft carrier with landing feet 232 in contact with the surface. Telescoping tail assemblies 214, 216 are in the retracted position prior to takeoff due to the weight of aircraft 200 forcing inner tailbooms 228 into outer housings 224. When aircraft 200 is ready for a mission, the flight control system commences operations providing flight commands to the various components of aircraft 200. The flight control system may be operating responsive to autonomous flight control, remote flight control or a combination thereof. For example, it may be desirable to utilize remote flight control during certain maneuvers such as takeoff and landing but rely on autonomous flight control during hover, high speed forward flight and transitions between wing-borne flight and thrust-borne flight. In other implementations, aircraft 200 may be a manned aircraft operated at least in part by a pilot.

As best seen in FIG. 6B, aircraft 200 has performed a vertical takeoff and is engaged in thrust-borne lift in the VTOL orientation of aircraft 200. As illustrated, rotor assemblies 220 of propulsion assemblies 202, 204 are each rotating in substantially the same horizontal plane. As longitudinal axis 250a and lateral axis 250b (denoted as the target) are both in a horizontal plane H that is normal to the local vertical in the earth's reference frame, aircraft 200 has a level flight attitude. In the VTOL orientation, wing 208 is the forward wing and wing 206 is the aft wing. As discussed herein, the flight control system independently controls and operates each propulsion assembly 202, 204 including independently controlling speed and thrust vectoring. During hover, the flight control system may utilize differential speed control and/or differential or collective thrust vectoring of propulsion assemblies 202, 204 to provide hover stability for aircraft 200 and to provide pitch, roll, yaw and translation authority for aircraft 200. As aircraft 200 is airborne and the weight of aircraft 200 is no longer forcing inner tailbooms 228 into outer housings 224, the gravitational force experienced by inner tailbooms 228 during takeoff in the VTOL orientation causes inner tailbooms 228 to slide from the retracted position to the extended position. This gravitational force overcomes the frictional force between inner tailbooms 228 and outer housings 224 so that inner tailbooms 228 extend until abutting limiters 238 while aft bearing 236 provides support to inner tailbooms 228. Extending telescoping tail assemblies 214, 216 in the VTOL orientation may be preferred in some implementations to allow for a less complex design for telescoping tail assemblies 214, 216 while optimizing drag, control and other flight parameters in both the VTOL and forward flight orientations.

After vertical ascent to the desired elevation, aircraft 200 may begin the transition from thrust-borne lift to wing-borne lift. As best seen from the progression of FIGS. 6B-6D, aircraft 200 is operable to pitch down from the VTOL orientation toward the forward flight, or biplane, orientation to enable high speed and/or long range forward flight. As seen in FIG. 6C, longitudinal axis 250a extends out of the horizontal plane H such that aircraft 200 has an inclined flight attitude of about sixty degrees pitch down. The flight control system may achieve this operation through speed control of some or all of propulsion assemblies 202, 204, thrust vectoring of some or all of propulsion assemblies 202, 204 or any combination thereof.

As best seen in FIGS. 6D and 6E, aircraft 200 has completed the transition to the forward flight orientation with rotor assemblies 220 of propulsion assemblies 202, 204 each rotating in substantially the same vertical plane. In the forward flight orientation, wing 206 is the upper wing positioned above wing 208, which is the lower wing. By convention, longitudinal axis 250a has been reset to be in the horizontal plane H, which also includes lateral axis 250b, such that aircraft 200 has a level flight attitude in the forward flight orientation. As forward flight with wing-borne lift requires significantly less power than VTOL flight with thrust-borne lift, the operating speed of some or all of propulsion assemblies 202, 204 may be reduced. In certain embodiments, some of propulsion assemblies 202, 204 of aircraft 200 could be shut down during forward flight. In the forward flight orientation, the independent control provided by the flight control system over each propulsion assembly 202, 204 provides pitch, roll and yaw authority for aircraft 200. In some embodiments, instead of responding to a gravitational force, inner tailbooms 228 may slide from the retracted position to the extended position in response to a drag force experienced by inner tailbooms 228 in either the forward flight orientation or the conversion orientation between the VTOL and forward flight orientations. Aerodynamic drag during forward flight may then retain telescoping tail assemblies 214, 216 in the extended position. In such embodiments, the frictional force between inner tailbooms 228 and outer housings 224 may be tailored such that the frictional force is overcome by the drag force in forward flight so that inner tailbooms 228 extend until abutting limiters 238 while aft bearing 236 provides support to inner tailbooms 228 in forward flight. With telescoping tail assemblies 214, 216 extended in forward flight, aircraft 200 is provided the orientational control and relative ease of maneuvering afforded by a longer coupled aircraft and is not restricted to the short coupled configuration in the retracted position.

As aircraft 200 approaches target ground location 252, which may be a landing zone, payload drop zone, waypoint or other stopping point depending on the mission, aircraft 200 may begin its transition from wing-borne lift to thrust-borne lift in a forward flight-to-VTOL transition phase best seen from the progression of FIGS. 6E-6G. Aircraft 200 is operable to pitch up from the forward flight orientation to the VTOL orientation to enable, as in the illustrated example, a vertical landing operation. As seen in FIG. 6F, longitudinal axis 250a extends out of the horizontal plane H such that aircraft 200 has an inclined flight attitude of about thirty degrees pitch up. The flight control system may achieve this operation through speed control of some or all of propulsion assemblies 202, 204, thrust vectoring of some or all of propulsion assemblies 202, 204 or any combination thereof. In FIG. 6G, aircraft 200 has completed the transition from the forward flight orientation to the VTOL orientation. By convention, longitudinal axis 250a has been reset to be in the horizontal plane H which also includes lateral axis 250b such that aircraft 200 has a level flight attitude in the VTOL orientation.

Once aircraft 200 has completed the transition to the VTOL orientation, aircraft 200 may hover and commence its vertical descent to target ground location 252. In other mission types, aircraft 200 may drop a payload or perform another operation over target ground location 252. In FIG. 6H, aircraft 200 descends to target ground location 252, which in the illustrated embodiment is a landing zone. In FIG. 6I, aircraft 200 rests in its tailsitter orientation on landing zone 252. Inner tailbooms 228 slide from the extended position to the retracted position in response to landing on landing zone 252 in the VTOL orientation. Aircraft 200, now shorter in length, may now take advantage of a smaller storage and transport footprint.

Figure 7A:
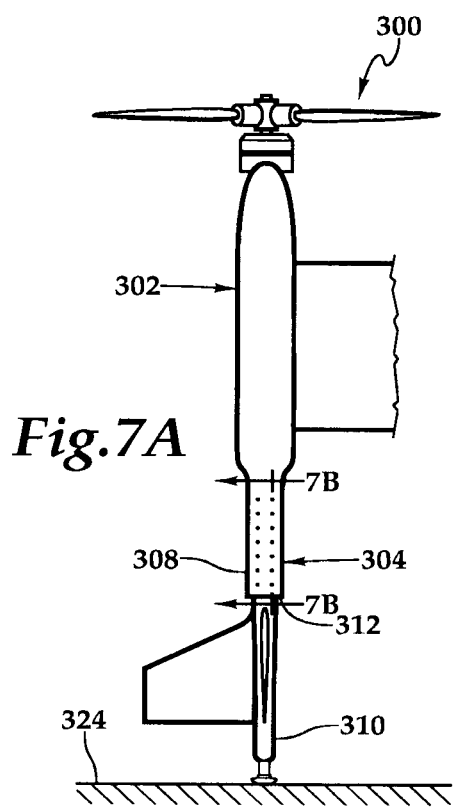
FIGS. 7A-7D are various views of a telescoping tail assembly including springs and a retainer in accordance with embodiments of the present disclosure.
Figure 7C:
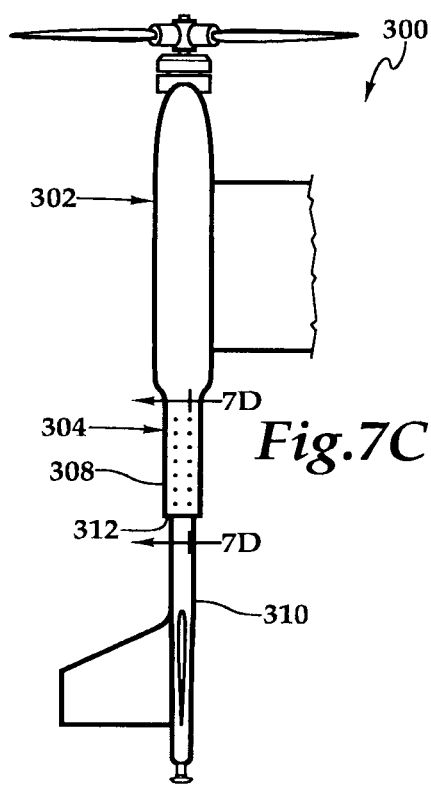
Figure 7B:
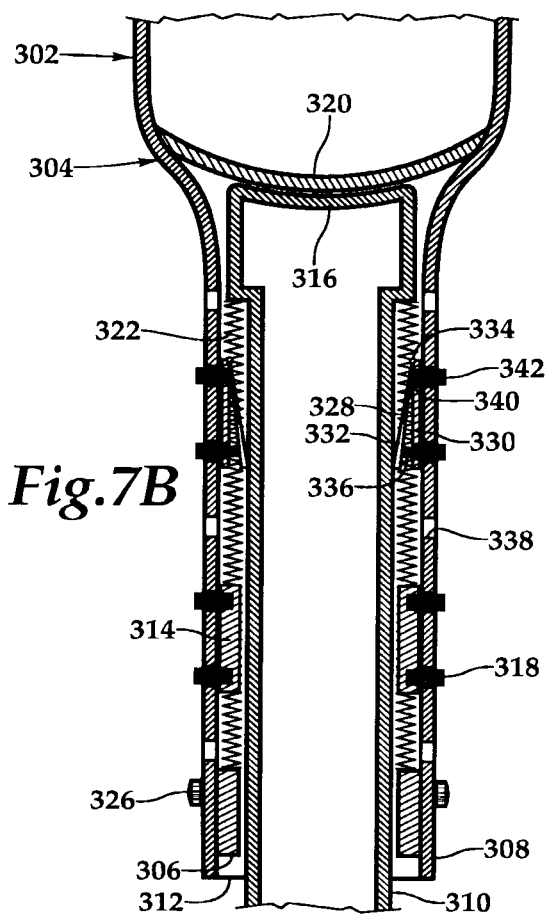
Figure 7D:
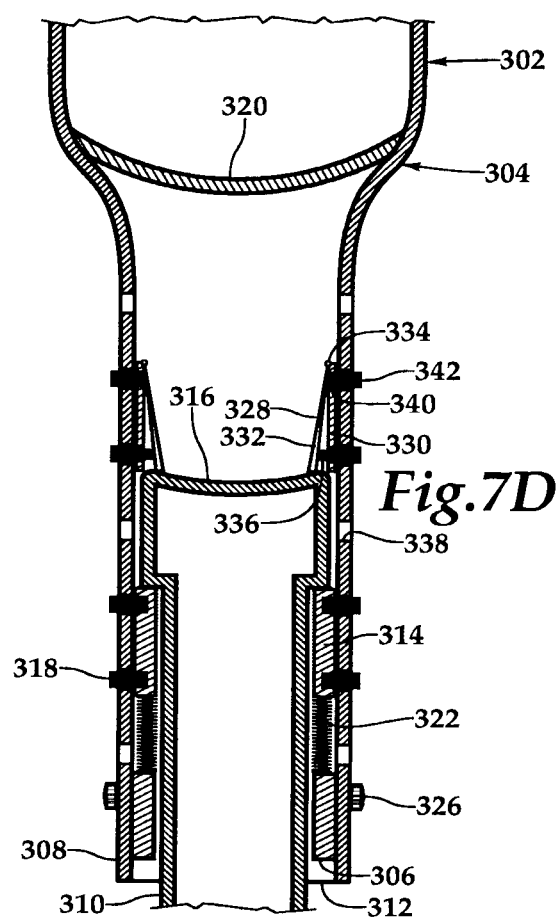

Referring to FIGS. 7A-7D in the drawings, aircraft 300 including propulsion assembly 302 with telescoping tail assembly 304 is schematically illustrated. FIGS. 7A-7B show telescoping tail assembly 304 in the retracted position and FIGS. 7C-7D show telescoping tail assembly 304 in the extended position. Telescoping tail assembly 304 includes aft bearing 306 interposed between outer housing 308 and inner tailboom 310 adjacent rear aperture 312. Aft bearing 306 supports inner tailboom 310 in various positions including the retracted, extended and intermediate positions. Limiter 314 prevents inner tailboom 310 from extending past a predetermined extended position. Forward end 316 of inner tailboom 310 has an enlarged diameter that causes forward end 316 of inner tailboom 310 to abut limiter 314 as inner tailboom 310 extends aftward toward the extended position. Limiter 314 is movable and selectively lockable along the length of outer housing 308 using adjustment pins 318 so that the predetermined extended position into which inner tailboom 310 is extendable may be adjusted by an operator of aircraft 300. Forward retraction stop 320 disposed forward of inner tailboom 310 limits inner tailboom 310 from retracting past a predetermined retracted position.

Telescoping tail assembly 304 includes springs 322, which help initiate motion of telescoping tail assembly 304 by biasing inner tailboom 310 toward the extended position until inner tailboom 310 hits limiter 314. In some embodiments, springs 322 may be coupled to either or both of outer housing 308 and inner tailboom 310. In the illustrated embodiment, springs 322 are tension springs with forward ends coupled to forward end 316 of inner tailboom 310 and aft ends coupled to outer housing 308 via aft bearing 306. In other embodiments, the aft ends of springs 322 may be coupled directly to outer housing 308 or another portion of telescoping tail assembly 304. While the illustrated embodiment shows a pair of tension springs, springs 322 may include any number of springs and any types of springs such as elastic bands. Springs 322 assist inner tailboom 310 to overcome the frictional force between outer housing 308 and inner tailboom 310 when moving to the extended position, which may be beneficial in operational scenarios in which the gravitational or drag force is insufficient to overcome such frictional force. When on surface 324, the weight of aircraft 300 opposes the biasing force of springs 322, as best seen in FIG. 7A. Springs 322 also help to ensure that all of the telescoping tail assemblies of aircraft 300 extend uniformly.

Telescoping tail assembly 304 includes spring tensioners 326 to adjust the tension of springs 322. Spring tensioners 326 may be installed in aft bearing 306 or any other location to which springs 322 are coupled. Spring tensioners 326 may be used to adjust the tension of springs 322 to better achieve desired translational positions of telescoping tail assembly 304 in view of anticipated flight loads. The tension of springs 322 may also be adjusted in view of the selected location of limiter 314 along the length of outer housing 308 to ensure a full extension of inner tailboom 310. The tension of springs 322 may also be adjusted to ensure that inner tailbooms 310 remain extended in the various orientations of aircraft 300 during flight.

Telescoping tail assembly 304 includes retainer 328 that selectively locks inner tailboom 310 in the extended position. Retainer 328 includes a base 330, a flap 332 rotatably coupled to base 330 via a forward pivot joint 334 and an aft pin spring 336 interposed between base 330 and flap 332. Aft pin spring 336 biases flap 332 into the engaged position shown in FIG. 7D, in which inner tailboom 310 is locked into the extended position. Aft pin spring 336 may be pulled to move retainer 328 into the disengaged position shown in FIG. 7B, in which inner tailboom 310 is able to freely slide or translate through outer housing 308 between the retracted and extended positions. While the illustrated embodiment shows telescoping tail assembly 304 using a pair of retainers 328, any number of retainers may be used.

Retainer 328 is movable and selectively lockable along the length of outer housing 308 so that the position in which inner tailboom 310 is locked may be customized. A number of alternative stop locations for retainer 328 along the length of outer housing 308 are provided by telescoping tail assembly 304 to provide for a customized back stop location at which to hold inner tailboom 310. More particularly, outer housing 308 forms adjustment holes 338 extending along the length of outer housing 308 and retainer 328 forms pin receivers 340. Adjustment pins 342 are received by both adjustment holes 338 in outer housing 308 and pin receivers 340 in retainer 328 to secure retainer 328 at a desired location along the length of outer housing 308. Adjustment pins 342 may be push pins that are pushed inward to allow longitudinal movement of retainer 328 or alternatively may be removable pins that are pulled out of pin receivers 340 to allow longitudinal movement of retainer 328 and inserted back into pin receivers 340 to lock retainer 328 into a desired position.

FIG. 7B shows telescoping tail assembly 304 in the retracted position and retainer 328 in the disengaged position. As inner tailboom 310 slides past retainer 328 with the assistance of springs 322, inner tailboom 310 compresses aft pin spring 336 so that retainer 328 is disengaged and inner tailboom 310 is allowed to slide aftward. Retainer 328 moves from the disengaged position to the engaged position shown in FIG. 7D when forward end 316 of inner tailboom 310 slides aft of retainer 328. With inner tailboom 310 no longer providing resistance, aft pin spring 336 pushes flap 332 toward the longitudinal center of outer housing 308 so that inner tailboom 310 is prevented from sliding in the forward direction. Retainer 328 rigidly holds or secures inner tailboom 310 in place to provide additional support for inner tailboom 310. Flap 332, forward pivot joint 334 and aft pin spring 336 react loads including shear loads and provide the requisite strength to support inner tailboom 310. While retainer 328 prevents inner tailboom 310 from retracting upon the landing of aircraft 300, retainer 328 may be disengaged after landing to allow telescoping tail assembly 304 to move into the retracted position. For example, aft pin spring 336 may be pulled outward to disengage retainer 328, allowing inner tailboom 310 to slide forward so that aircraft 300 can be reconfigured on the ground. In some embodiments, retainer 328 may be removed altogether from telescoping tail assembly 304. In such embodiments, springs 322 may be tensioned or sized such that springs 322 retain inner tailboom 310 in the extended position during flight but allow the weight of aircraft 300 to return inner tailboom 310 to its initial compressed and retracted position upon landing without human intervention.

Figure 8A:
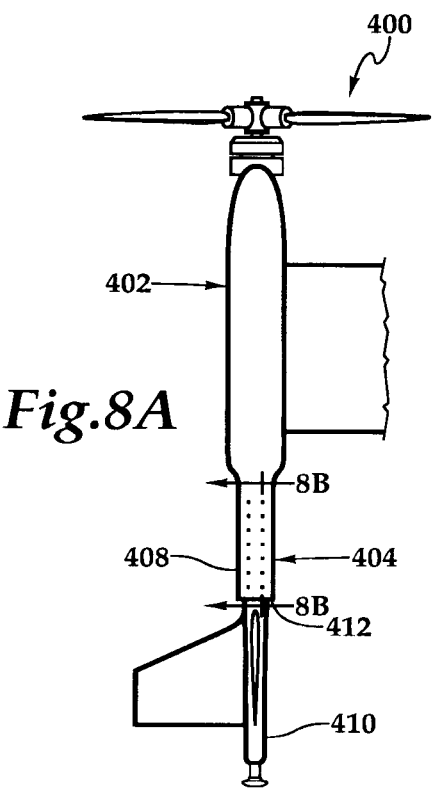
FIGS. 8A-8D are various views of an active telescoping tail assembly in accordance with embodiments of the present disclosure.
Figure 8C:
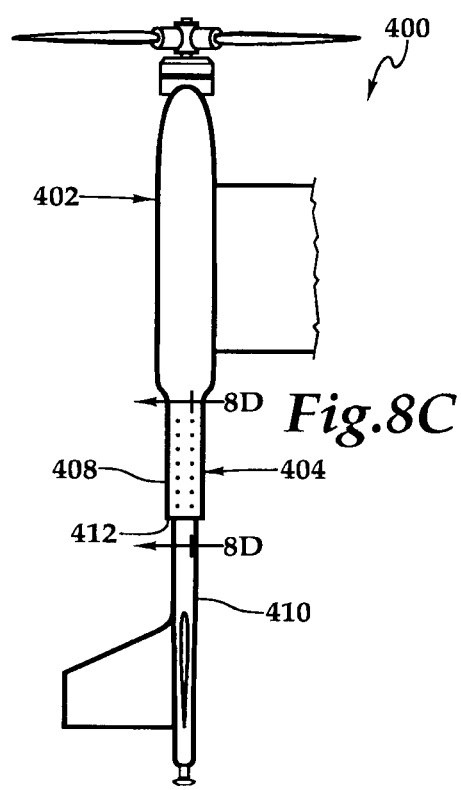
Figure 8B:
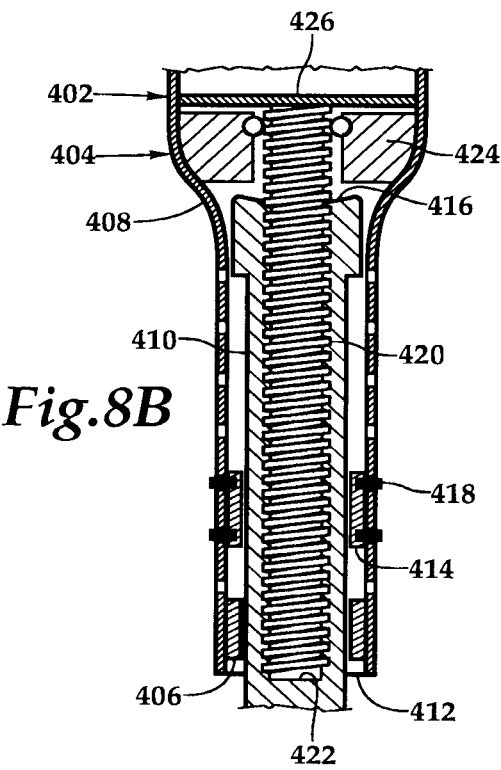
Figure 8D:
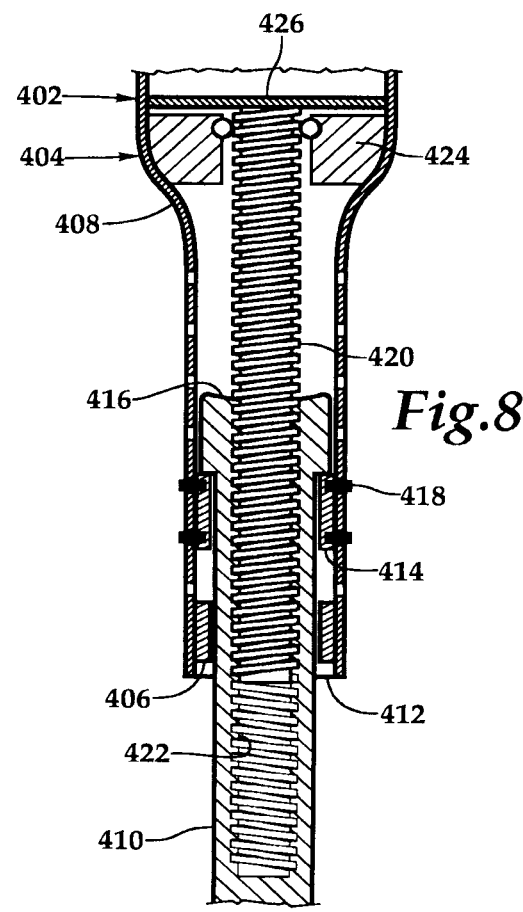

Referring to FIGS. 8A-8D in the drawings, aircraft 400 including propulsion assembly 402 with telescoping tail assembly 404 is schematically illustrated. FIGS. 8A-8B show telescoping tail assembly 404 in the retracted position and FIGS. 8C-8D show telescoping tail assembly 404 in the extended position. Telescoping tail assembly 404 includes aft bearing 406 interposed between outer housing 408 and inner tailboom 410 adjacent rear aperture 412. Aft bearing 406 supports inner tailboom 410 in various positions including the retracted, extended and intermediate positions. Limiter 414 prevents inner tailboom 410 from extending past a predetermined extended position. Forward end 416 of inner tailboom 410 has an enlarged diameter that causes forward end 416 of inner tailboom 410 to abut limiter 414 as inner tailboom 410 extends aftward toward the extended position. Limiter 414 is movable and selectively lockable along the length of outer housing 408 using adjustment pins 418 so that the predetermined extended position into which inner tailboom 410 is extendable may be adjusted by an operator of aircraft 400.

Telescoping tail assembly 404 is an active embodiment of a telescoping tail assembly that is actuated to move between the retracted and extended positions to allow for precision control and trim capability. Telescoping tail assembly 404 includes a jackscrew 420. Inner tailboom 410 forms a jackscrew cavity 422 through which jackscrew 420 is translatable. Jackscrew 420 is also coupled to inner tailboom 410 at jackscrew cavity 422. Telescoping tail assembly 404 includes an actuator 424 such as a rotary electromechanical actuator coupled to jackscrew 420. In the illustrated embodiment, actuator 424 is mounted to outer housing 408, although actuator 424 may be mounted elsewhere in other embodiments. Actuator 424 selectively rotates or drives jackscrew 420 in either direction to slide inner tailboom 410 between the retracted and extended positions as desired. Jackscrew 420 is rotatably coupled to an airframe portion 426 of aircraft 400 and does not translate in the longitudinal direction so that no additional space is required in propulsion assembly 402 to accommodate translational travel of jackscrew 420. In other embodiments, however, jackscrew 420 may be hard-mounted to inner tailboom 410 and actuator 424 may rotate to translate both jackscrew 420 and inner tailboom 410 in the longitudinal direction. In some embodiments, outer housing 408 and inner tailboom 410 may include a slot and receiver mechanism to clock inner tailboom 410 into a desired rotational orientation, thereby preventing inner tailboom 410 from spinning when sliding between the retracted and extended positions. The active actuation of telescoping tail assembly 404 allows for non-uniform positioning of the telescoping tail assemblies of aircraft 400. For example, the upper telescoping tail assemblies may be extended while the lower telescoping tail assemblies are retracted, or vice versa. Telescoping tail assembly 404 is fully adjustable in flight and allows for the telescoping tail assemblies of aircraft 400 to be tailored to any flight condition, similar to how stabilizers may be used for larger aircraft. Telescoping tail assembly 404 also allows for a fine level of control and positioning. In some embodiments, actuator 424 may automatically move telescoping tail assembly 404 to a retracted ground configuration upon landing without the need for human input.

Figure 9A:
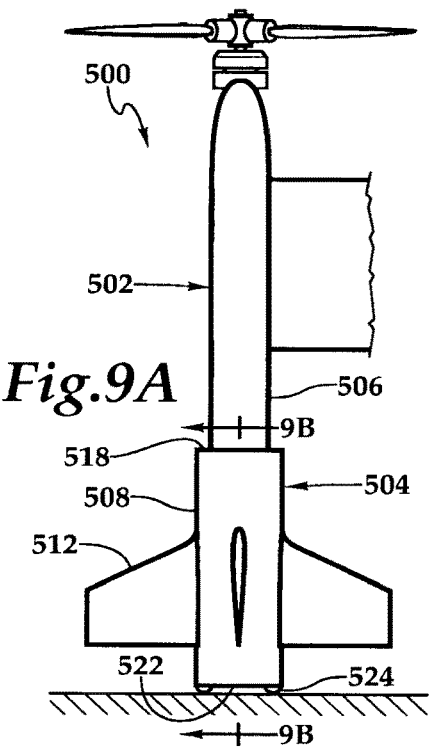
FIGS. 9A-9D are various views of a telescoping tail assembly having an inner housing and an outer tailboom in accordance with embodiments of the present disclosure.
Figure 9C:
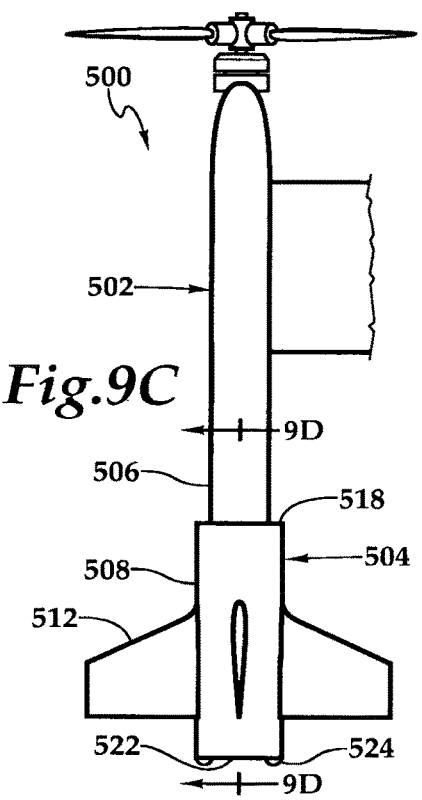
Figure 9B:
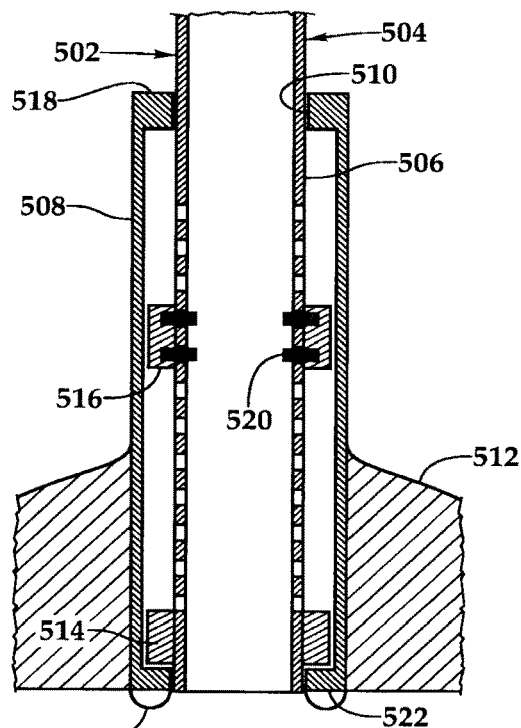
Figure 9D:
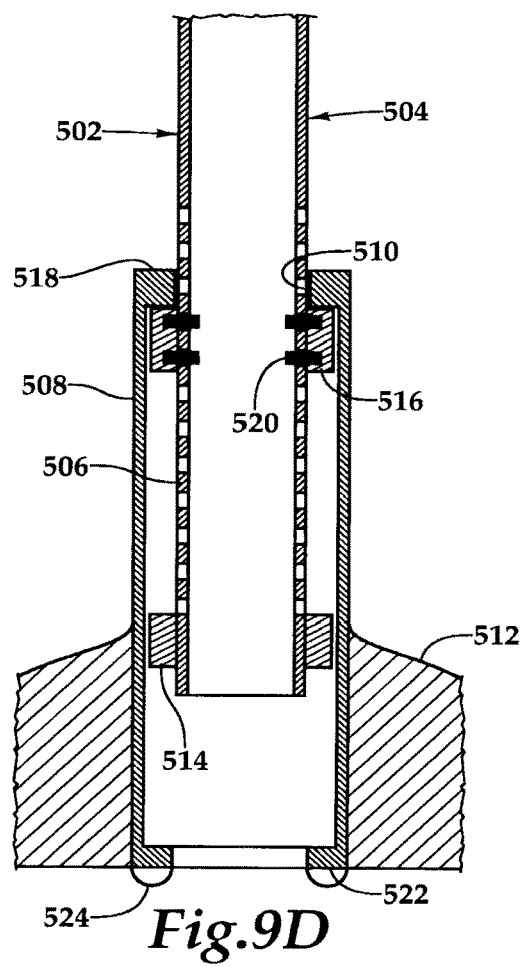

Referring to FIGS. 9A-9D in the drawings, aircraft 500 including propulsion assembly 502 with telescoping tail assembly 504 is schematically illustrated. FIGS. 9A-9B show telescoping tail assembly 504 in the retracted position and FIGS. 9C-9D show telescoping tail assembly 504 in the extended position. Telescoping tail assembly 504 has a reverse telescoping configuration with an inner housing 506 and an outer tailboom 508 having a forward end forming a forward aperture 510. Inner housing 506 is slidably receivable into outer tailboom 508 via forward aperture 510. Control surfaces 512 are coupled to outer tailboom 508. The reverse telescoping configuration of FIGS. 9A-9D allows for the entire length of outer tailboom 508 to collapse alongside inner housing 506 since control surfaces 512 do not obstruct the retraction of telescoping tail assembly 504.

Telescoping tail assembly 504 includes aft bearing 514 interposed between inner housing 506 and outer tailboom 508 adjacent the aft end of inner housing 506. Aft bearing 514 supports outer tailboom 508 in various positions including the retracted, extended and intermediate positions. Limiter 516 prevents outer tailboom 508 from extending past a predetermined extended position. Forward end 518 of outer tailboom 508 has an enlarged wall dimension in the form of an inner flange that causes forward end 518 of outer tailboom 508 to abut limiter 516 as outer tailboom 508 extends aftward toward the extended position. Limiter 516 is movable and selectively lockable along the length of inner housing 506 using adjustment pins 520 so that the predetermined extended position into which outer tailboom 508 is extendable may be adjusted by an operator of aircraft 500. Aft end 522 of outer tailboom 508 has an enlarged wall dimension in the form of an inner flange that abuts aft bearing 514 to limit outer tailboom 508 from retracting past a predetermined retracted position as best seen in FIG. 9B. Aft end 522 of outer tailboom 508 may also include one or more landing feet 524.

Figure 10A:
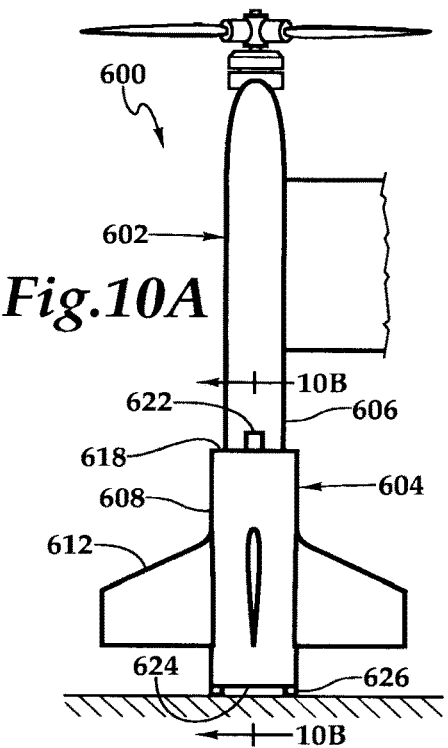
FIGS. 10A-10D are various views of a telescoping tail assembly having an inner housing, an outer tailboom and a forward retraction stop in accordance with embodiments of the present disclosure.
Figure 10C:
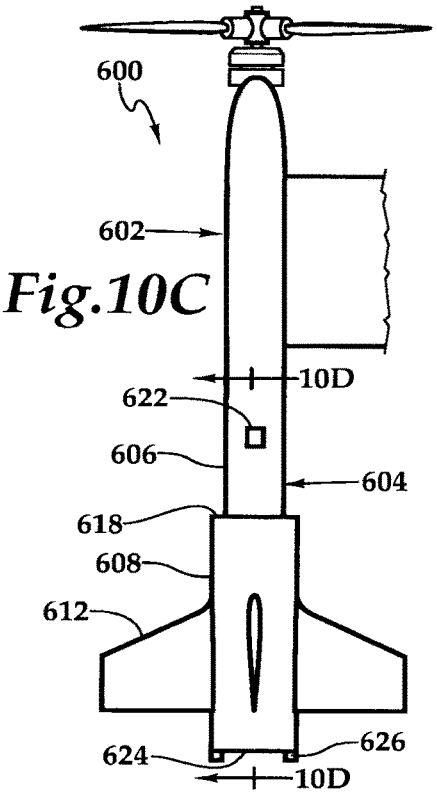
Figure 10B:
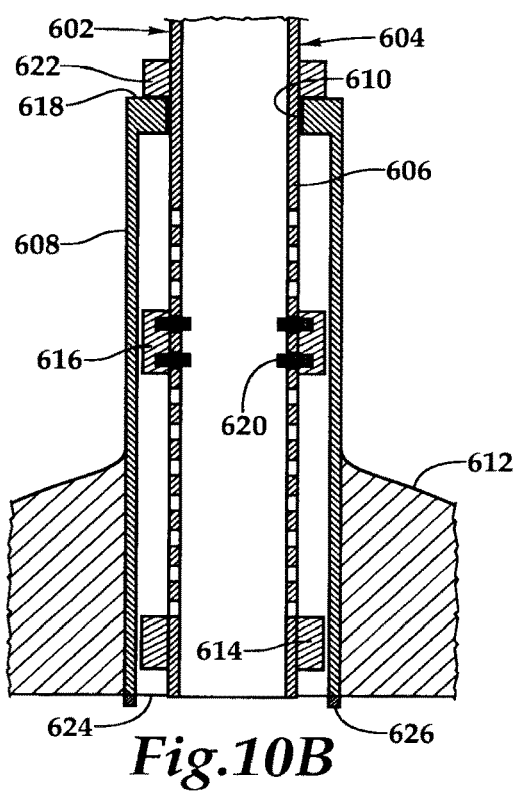
Figure 10D:
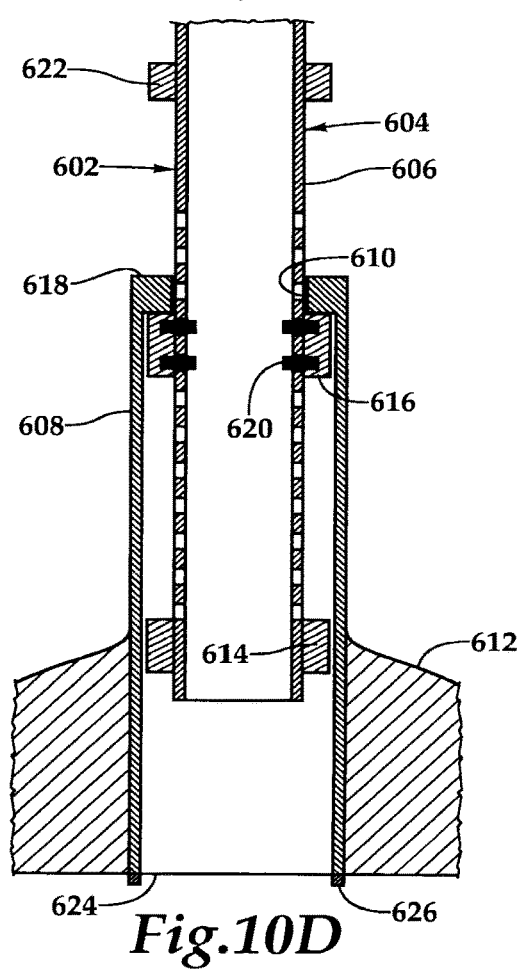

Referring to FIGS. 10A-10D in the drawings, aircraft 600 including propulsion assembly 602 with telescoping tail assembly 604 is schematically illustrated. FIGS. 10A-10B show telescoping tail assembly 604 in the retracted position and FIGS. 10C-10D show telescoping tail assembly 604 in the extended position. Telescoping tail assembly 604 includes inner housing 606 and outer tailboom 608 having a forward end forming a forward aperture 610. Inner housing 606 is slidably receivable into outer tailboom 608 via forward aperture 610. Control surfaces 612 are coupled to outer tailboom 608.

Telescoping tail assembly 604 includes aft bearing 614 interposed between inner housing 606 and outer tailboom 608 adjacent the aft end of inner housing 606. Aft bearing 614 supports outer tailboom 608 in various positions including the retracted, extended and intermediate positions. Limiter 616 prevents outer tailboom 608 from extending past a predetermined extended position. Forward end 618 of outer tailboom 608 has an enlarged wall dimension in the form of an inner flange that causes forward end 618 of outer tailboom 608 to abut limiter 616 as outer tailboom 608 extends aftward toward the extended position. Limiter 616 is movable and selectively lockable along the length of inner housing 606 using adjustment pins 620 so that the predetermined extended position into which outer tailboom 608 is extendable may be adjusted by an operator of aircraft 600. One or more forward retraction stops 622, which may be annular shaped or include a number of blocks, are coupled to inner housing 606 forward of outer tailboom 608 to limit outer tailboom 608 from retracting past a predetermined retracted position. Aft end 624 of outer tailboom 608 may also include one or more landing feet 626.

Figure 11A:
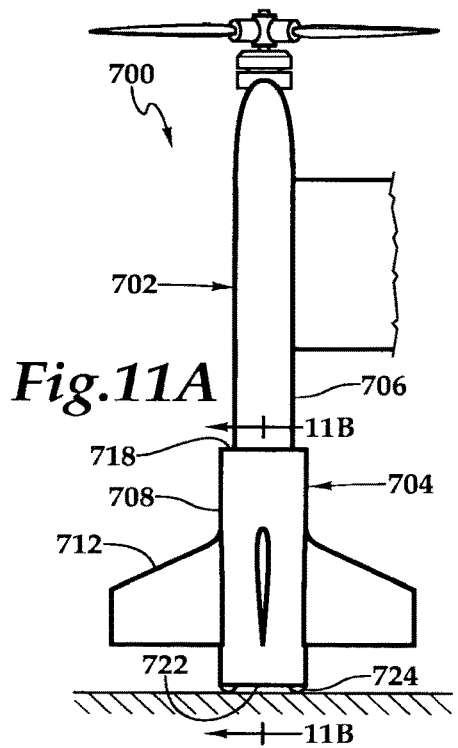
FIGS. 11A-11D are various views of a telescoping tail assembly having an inner housing, an outer tailboom and springs in accordance with embodiments of the present disclosure.
Figure 11C:
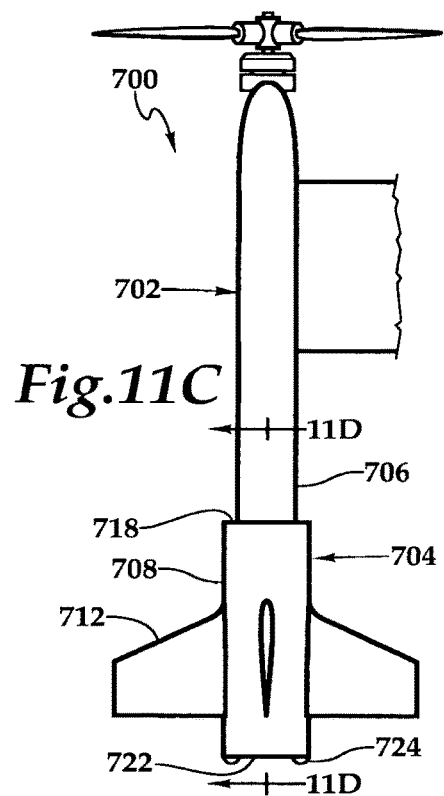
Figure 11B:
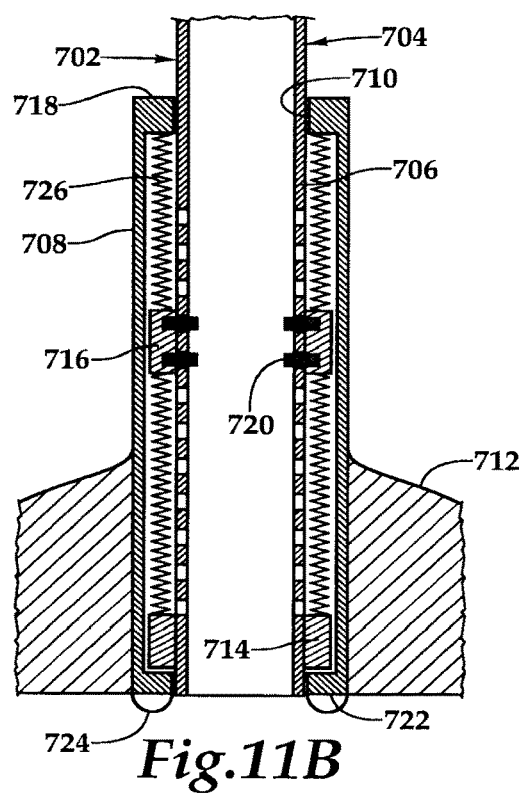
Figure 11D:
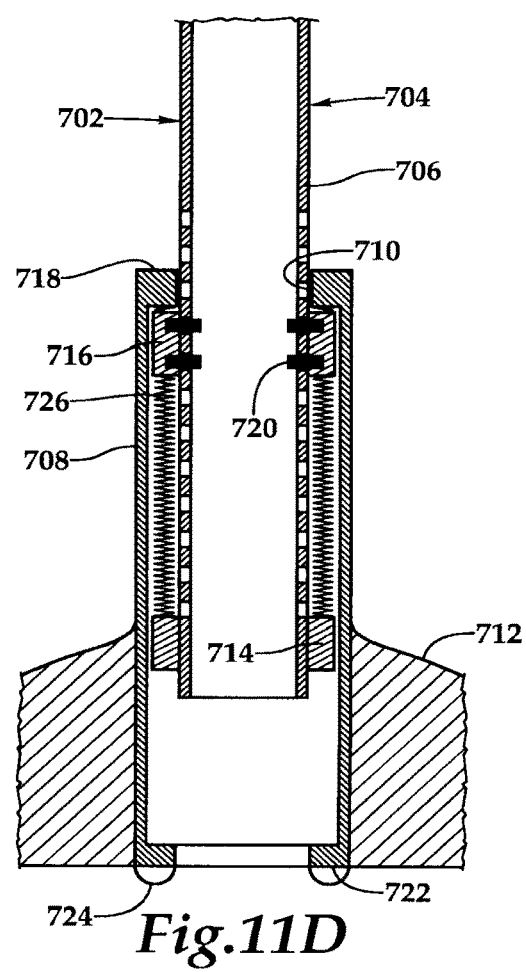

Referring to FIGS. 11A-11D in the drawings, aircraft 700 including propulsion assembly 702 with telescoping tail assembly 704 is schematically illustrated. FIGS. 11A-11B show telescoping tail assembly 704 in the retracted position and FIGS. 11C-11D show telescoping tail assembly 704 in the extended position. Telescoping tail assembly 704 includes inner housing 706 and outer tailboom 708 having a forward end forming a forward aperture 710. Inner housing 706 is slidably receivable into outer tailboom 708 via forward aperture 710. Control surfaces 712 are coupled to outer tailboom 708.

Telescoping tail assembly 704 includes aft bearing 714 interposed between inner housing 706 and outer tailboom 708 adjacent the aft end of inner housing 706. Aft bearing 714 supports outer tailboom 708 in various positions including the retracted, extended and intermediate positions. Limiter 716 prevents outer tailboom 708 from extending past a predetermined extended position. Forward end 718 of outer tailboom 708 has an enlarged wall dimension in the form of an inner flange that causes forward end 718 of outer tailboom 708 to abut limiter 716 as outer tailboom 708 extends aftward toward the extended position. Limiter 716 is movable and selectively lockable along the length of inner housing 706 using adjustment pins 720 so that the predetermined extended position into which outer tailboom 708 is extendable may be adjusted by an operator of aircraft 700. Aft end 722 of outer tailboom 708 has an enlarged wall dimension in the form of an inner flange that abuts aft bearing 714 to limit outer tailboom 708 from retracting past a predetermined retracted position as best seen in FIG. 11B. Aft end 722 of outer tailboom 708 may also include one or more landing feet 724.

Telescoping tail assembly 704 includes springs 726, which help initiate motion of telescoping tail assembly 704 by biasing outer tailboom 708 toward the extended position until outer tailboom 708 hits limiter 716. In some embodiments, springs 726 may be coupled to either or both of inner housing 706 and outer tailboom 708. In the illustrated embodiment, springs 726 are tension springs with forward ends coupled to forward end 718 of outer tailboom 708 and aft ends coupled to inner housing 706 via aft bearing 714. In other embodiments, the aft ends of springs 726 may be coupled directly to inner housing 706 or another portion of telescoping tail assembly 704. While the illustrated embodiment shows a pair of tension springs, springs 726 may include any number of springs and any types of springs such as elastic bands. Telescoping tail assembly 704 may include spring tensioners to adjust the tension of springs 726. In some embodiments, telescoping tail assembly 704 may include a retainer similar to retainer 328 in FIGS. 7B and 7D to selectively lock outer tailboom 708 in the extended position.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A telescoping tail assembly for use on an aircraft having a fore-aft length, the telescoping tail assembly comprising:
   a housing extending in an aftward direction;
   a tailboom slidable along the housing into a plurality of positions including an extended position and a retracted position;
   a jackscrew coupled to the tailboom, the jackscrew coaxial with the tailboom;
   an actuator coupled to the jackscrew, the actuator configured to selectively rotate the jackscrew to translate the tailboom between the plurality of positions; and
   one or more control surfaces coupled to the tailboom;
   wherein, a portion of the tailboom and the jackscrew are disposed within the housing;
   wherein, the jackscrew is coaxial with the housing such that the jackscrew, the housing and the tailboom are coaxial in both the extended and retracted positions;
   wherein, the tailboom increases the fore-aft length of the aircraft in the extended position and decreases the fore-aft length of the aircraft in the retracted position; and
   wherein, the actuator is configured to automatically move the tailboom into the retracted position upon landing.

2. The telescoping tail assembly as recited in claim 1 wherein, the housing is an outer housing having an aft end forming a rear aperture; and
   wherein, the tailboom is an inner tailboom slidably receivable into the outer housing via the rear aperture.

3. The telescoping tail assembly as recited in claim 1 further comprising an annular aft bearing interposed between the housing and the tailboom adjacent an aft end of the housing, the aft bearing configured to support the tailboom in the plurality of positions.

4. The telescoping tail assembly as recited in claim 1 wherein, the actuator is a rotary electromechanical actuator.

5. The telescoping tail assembly as recited in claim 1 further comprising a limiter interposed between the housing and the tailboom, the limiter configured to limit the tailboom from extending past a predetermined extended position.

6. The telescoping tail assembly as recited in claim 5 wherein, the tailboom has a forward end having an enlarged dimension configured to abut the limiter in the predetermined extended position.

7. The telescoping tail assembly as recited in claim 5 wherein, the limiter is an adjustable limiter movable and selectively lockable along a length of the housing to change the predetermined extended position of the tailboom.

8. The telescoping tail assembly as recited in claim 7 wherein, the housing forms a plurality of adjustment holes extending along the length of the housing and the limiter forms one or more pin receivers, the telescoping tail assembly further comprising:
   one or more adjustment pins receivable by the plurality of adjustment holes in the housing and the one or more pin receivers of the limiter to secure the limiter at a location along the length of the housing.

9. The telescoping tail assembly as recited in claim 1 wherein, the tailboom translates between the plurality of positions relative to the housing and relative to the jackscrew responsive to rotation of the jackscrew.

10. The telescoping tail assembly as recited in claim 1 wherein, the tailboom further comprises a jackscrew cavity; and
    wherein, the jackscrew is received within and is rotatable relative to the jackscrew cavity such that rotation of the jackscrew translates the tailboom between the plurality of positions.

11. A propulsion assembly for an aircraft, the propulsion assembly having a fore-aft length, the propulsion assembly comprising:
    a nacelle having forward and aft ends;
    a rotor assembly coupled to the forward end of the nacelle; and
    a telescoping tail assembly at the aft end of the nacelle, the telescoping tail assembly comprising:
    a housing extending in an aftward direction;
    a tailboom slidable along the housing into a plurality of positions including an extended position and a retracted position;
    a jackscrew coupled to the tailboom, the jackscrew coaxial with the tailboom;
    an actuator coupled to the jackscrew, the actuator configured to selectively rotate the jackscrew to translate the tailboom between the plurality of positions; and
    one or more control surfaces coupled to the tailboom;
    wherein, a portion of the tailboom and the jackscrew are disposed within the housing;
    wherein, the jackscrew is coaxial with the housing such that the jackscrew, the housing and the tailboom are coaxial in both the extended and retracted positions;
    wherein, the tailboom increases the fore-aft length of the propulsion assembly in the extended position and decreases the fore-aft length of the propulsion assembly in the retracted position; and
    wherein, the actuator is configured to automatically move the tailboom into the retracted position upon landing.

12. The propulsion assembly as recited in claim 11 wherein, the housing is an outer housing having an aft end forming a rear aperture; and
    wherein, the tailboom is an inner tailboom slidably receivable into the outer housing via the rear aperture.

13. The propulsion assembly as recited in claim 11 further comprising an annular aft bearing interposed between the housing and the tailboom adjacent an aft end of the housing, the aft bearing configured to support the tailboom in the plurality of positions.

14. The propulsion assembly as recited in claim 11 further comprising a limiter interposed between the housing and the tailboom, the limiter configured to limit the tailboom from extending past a predetermined extended position, the limiter movable and selectively lockable along a length of the housing to change the predetermined extended position of the tailboom.

15. The propulsion assembly as recited in claim 11 wherein, the tailboom translates between the plurality of positions relative to the housing and relative to the jackscrew responsive to rotation of the jackscrew.

16. An aircraft operable to transition between thrust-borne lift in a VTOL orientation and wing-borne lift in a biplane orientation, the aircraft comprising:
    an airframe; and
    a thrust array attached to the airframe, the thrust array including a plurality of propulsion assemblies each having a fore-aft length, each propulsion assembly comprising:
    a nacelle having forward and aft ends;
    a rotor assembly coupled to the forward end of the nacelle; and
    a telescoping tail assembly at the aft end of the nacelle, the telescoping tail assembly comprising:

a housing extending in an aftward direction;

a tailboom slidable along the housing into a plurality of positions including an extended position and a retracted position;

a jackscrew coupled to the tailboom, the jackscrew coaxial with the tailboom;

an actuator coupled to the jackscrew, the actuator configured to selectively rotate the jackscrew to translate the tailboom between the plurality of positions; and one or more control surfaces coupled to the tailboom;

wherein, a portion of the tailboom and the jackscrew are disposed within the housing;

wherein, the jackscrew is coaxial with the housing such that the jackscrew, the housing and the tailboom are coaxial in both the extended and retracted positions;

wherein, the tailboom increases the fore-aft length of each propulsion assembly in the extended position and decreases the fore-aft length of each propulsion assembly in the retracted position; and wherein, the actuator is configured to automatically move the tailboom into the retracted position upon landing.

17. The aircraft as recited in claim 16 wherein, for each propulsion assembly, the housing is an outer housing having an aft end forming a rear aperture; and wherein, the tailboom is an inner tailboom slidably receivable into the outer housing via the rear aperture.

18. The aircraft as recited in claim 16 wherein, each propulsion assembly further comprises a limiter interposed between the housing and the tailboom, the limiter configured to limit the tailboom from extending past a predetermined extended position, the limiter movable and selectively lockable along a length of the housing to change the predetermined extended position of the tailboom.

19. The aircraft as recited in claim 16 wherein, for each propulsion assembly, the tailboom translates between the plurality of positions relative to the housing and relative to the jackscrew responsive to rotation of the jackscrew.

20. The aircraft as recited in claim 16 wherein, a forward end of the jackscrew is coupled to an airframe portion such that the jackscrew is nontranslatable in a longitudinal direction of the nacelle; and wherein, the actuator is coupled to the forward end of the jackscrew.

* * * * *